United States Patent [19]
Nygren, Jr. et al.

[11] Patent Number: 5,888,012
[45] Date of Patent: Mar. 30, 1999

[54] LARGE SHEAR TOLERANT FASTENING SYSTEM

[75] Inventors: William D. Nygren, Jr., Denver; Arwen G. Isaac, Golden, both of Colo.

[73] Assignee: Lockheed Martin Corporation, Bethesda, Md.

[21] Appl. No.: 687,136

[22] Filed: Jul. 24, 1996

[51] Int. Cl.$^6$ .................................................. F16B 39/00
[52] U.S. Cl. ........................ 403/13; 403/22; 403/408.1; 411/113; 411/368; 411/539
[58] Field of Search .................................. 403/261, 260, 403/259, 258, 257, 256, 12, 408.1, 13, 22; 411/112, 113, 366, 368, 537, 539, 108, 161, 160

[56] References Cited

U.S. PATENT DOCUMENTS

| | | | |
|---|---|---|---|
| 1,774,695 | 9/1930 | Baynes | 411/11 |
| 1,950,041 | 3/1934 | Torchia et al. | 36/15 |
| 2,361,814 | 10/1944 | Berry | 151/19 |
| 2,562,032 | 7/1951 | Gutensohn | 151/20 |
| 2,709,470 | 5/1955 | Knohl | 151/37 |
| 3,053,357 | 9/1962 | Stanger | 411/112 X |
| 3,151,653 | 10/1964 | Zahodiakin | 151/19 |
| 3,157,215 | 11/1964 | Zahodiakin | 151/19 |
| 3,171,518 | 3/1965 | Bergmann | 189/36 |
| 3,295,580 | 1/1967 | Waltermire | 151/37 |
| 3,352,341 | 11/1967 | Schertz | 151/19 |
| 3,417,802 | 12/1968 | Oldenkott | 411/161 X |
| 3,438,416 | 4/1969 | Thurston | 151/37 |
| 3,438,417 | 4/1969 | Albris | 151/37 |
| 3,749,362 | 7/1973 | O'Connor et al. | 411/537 X |
| 3,835,615 | 9/1974 | King, Jr. | 411/368 X |
| 3,877,339 | 4/1975 | Muenchinger | 85/9 R |
| 4,006,661 | 2/1977 | Sims, Jr. | 85/62 |
| 4,083,393 | 4/1978 | Okada | 151/19 A |
| 4,378,187 | 3/1983 | Fullerton | 411/267 |
| 4,464,091 | 8/1984 | Molina | 411/108 X |
| 5,118,237 | 6/1992 | Wright | 411/433 |
| 5,139,381 | 8/1992 | Lubreski et al. | 411/433 |
| 5,427,488 | 6/1995 | Fullerton et al. | 411/433 |
| 5,466,106 | 11/1995 | Bone et al. | 411/433 |
| 5,545,230 | 8/1996 | Kinsinger et al. | 411/537 X |

FOREIGN PATENT DOCUMENTS

| | | | |
|---|---|---|---|
| 225750 | 8/1985 | German Dem. Rep. | 403/408.1 |
| 495976 | 11/1938 | United Kingdom | 411/113 |

OTHER PUBLICATIONS

"Knurled–Face Washers" Brochure, Carr Lane Mfg. Co. (no date).

*Primary Examiner*—Harry C. Kim
*Attorney, Agent, or Firm*—Holme Roberts & Owen

[57] ABSTRACT

A fastening system for substantially inhibiting slippage between first and second members interconnected thereby is disclosed. The fastening system is particularly useful in instances where at least one of the first and second members is subject to shear loading. The fastening system may include a fastener having a shank portion which is receivable within first and second bores of the first and second members, respectively, and a nose portion of a nut member for engaging a proximal segment of the shank portion of the fastener proximate the second member to substantially inhibit tilting of the fastener relative to the first and/or second member(s).

24 Claims, 19 Drawing Sheets

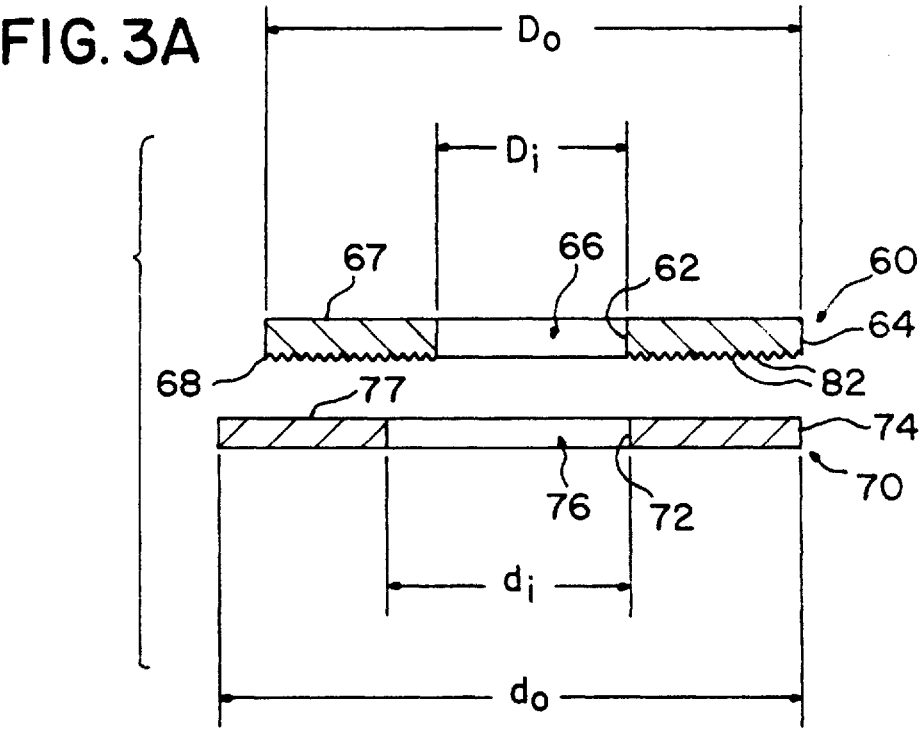
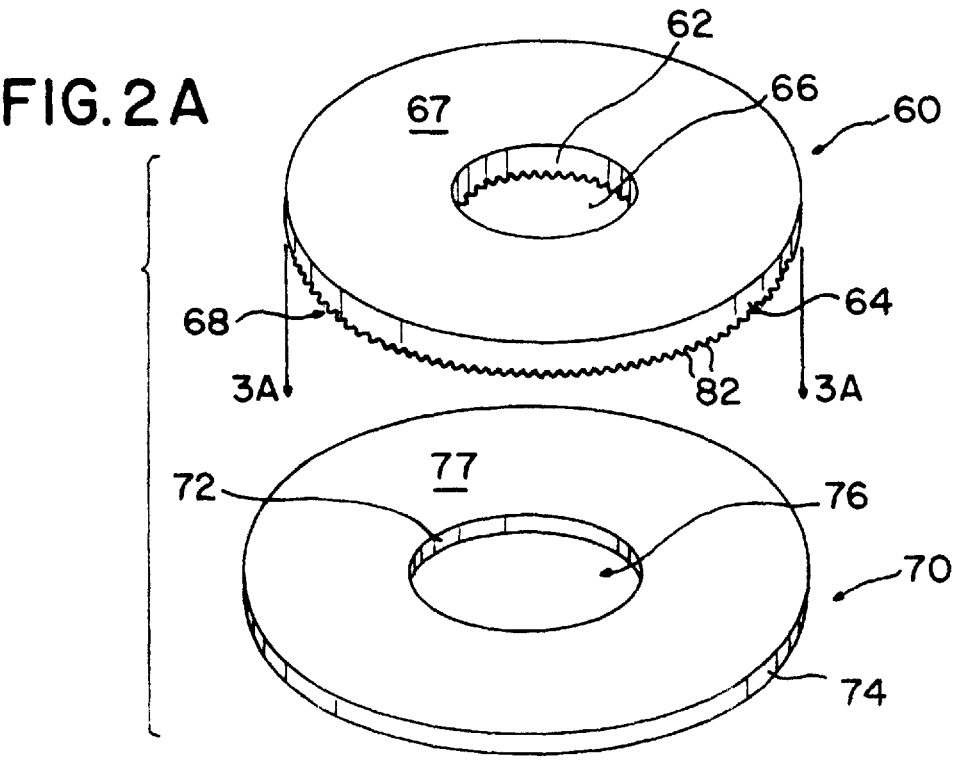

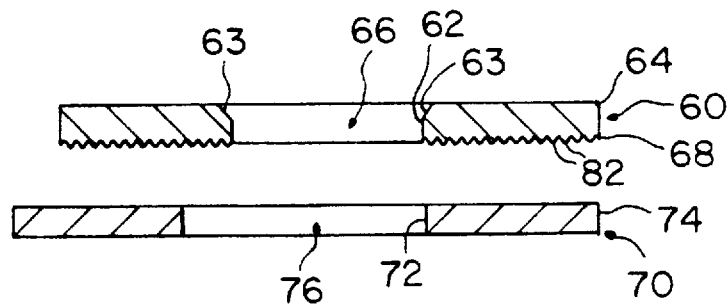
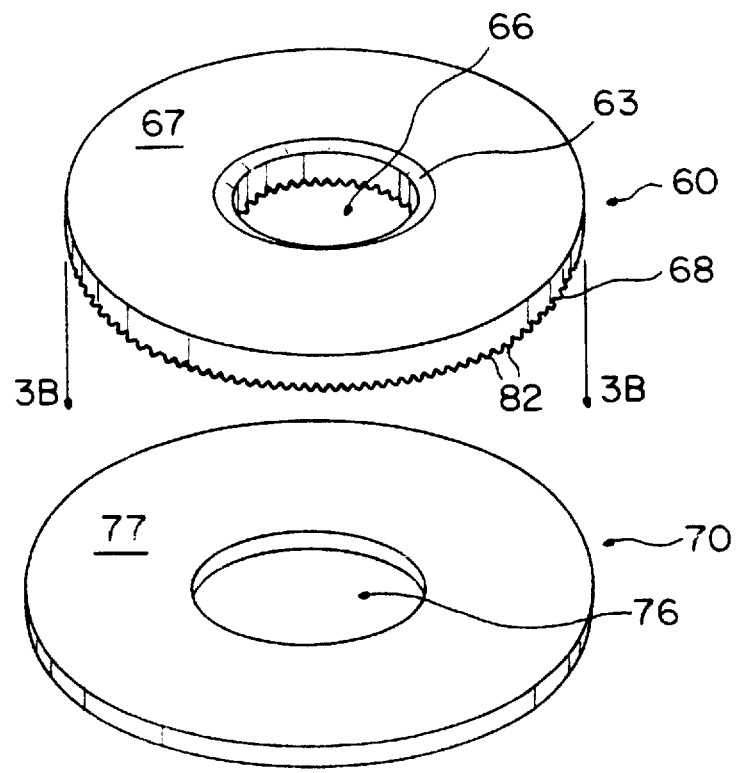

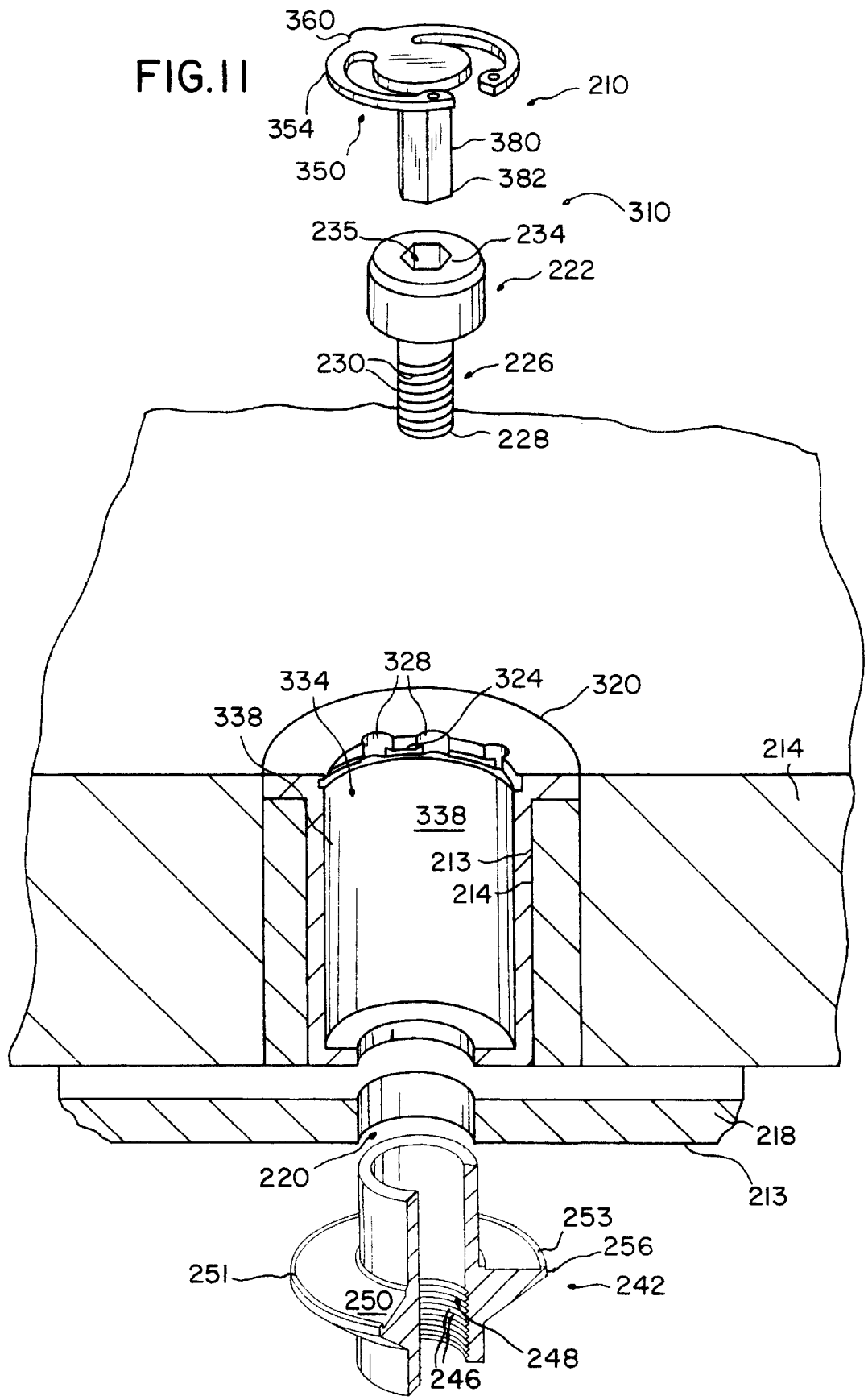

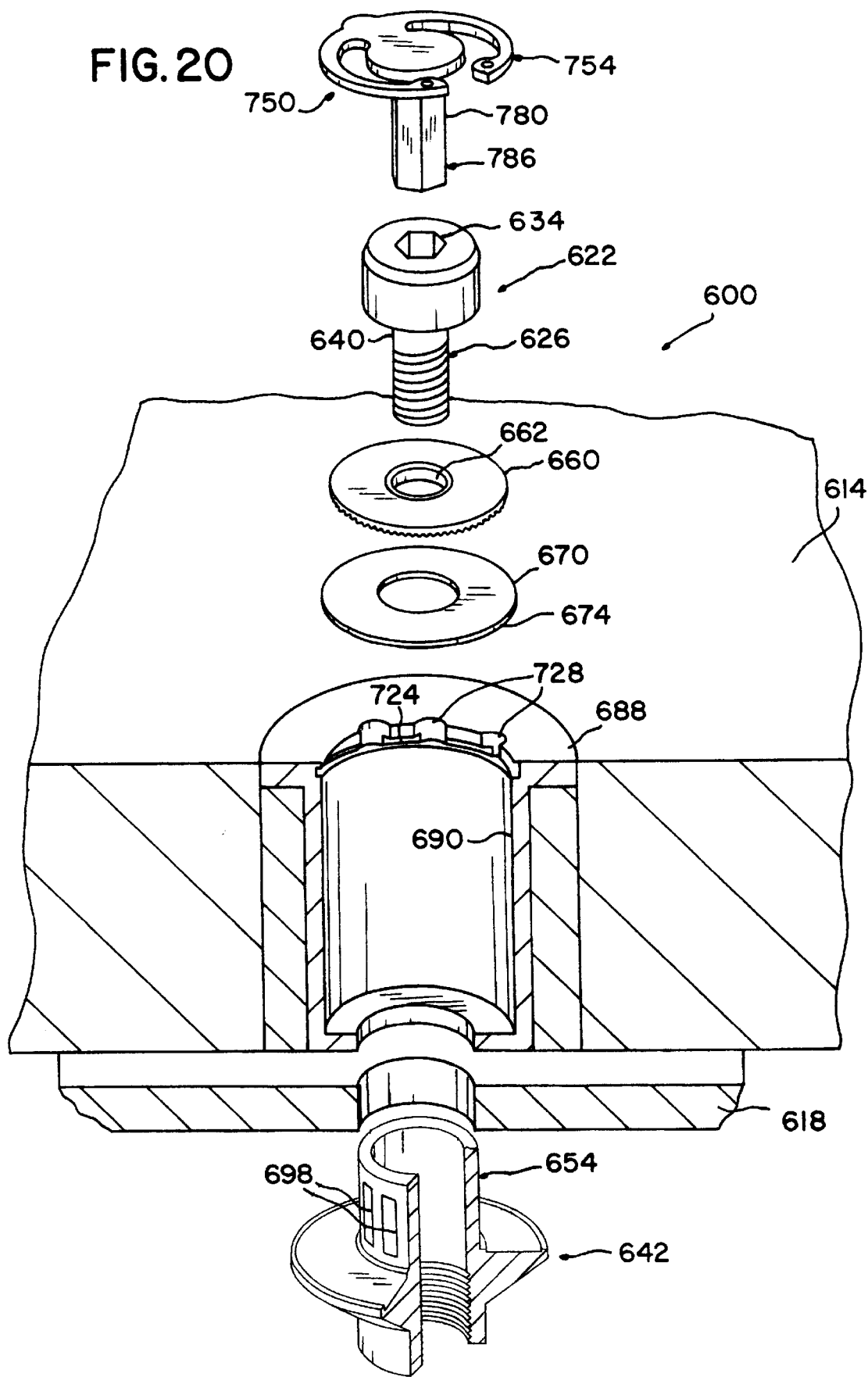

5,888,012

LARGE SHEAR TOLERANT FASTENING SYSTEM

FIELD OF THE INVENTION

The present invention generally relates to fasteners, and, in particular, to nut and bolt-type fastening systems for interconnecting one object to another object.

BACKGROUND OF THE INVENTION

For purposes of fastening together first and second members, a nut and bolt fastening system is typically utilized. More specifically, in order to fasten a first member to a second member, a threaded shank portion of a bolt is typically inserted through bores in the first and second members and threadedly engaged with a nut.

In order to address situations in which the first and/or second member will be subjected to shear loads, various devices and techniques have been developed to relieve the resulting shear stress on the fastening system, and specifically, the bolt. Such developments have also concentrated upon inhibiting slippage of the first member relative to the second member in instances where the first and/or second member is subject to large shear loads. For example, one such system for relieving shear stress on the fastening system and for inhibiting slippage of the first member relative to the second member involves inserting a number of press-fit pins into first and second members. Such press-fit pins substantially inhibit slippage of the first member relative to the second member. However, replacement of, for example, the first member is time consuming and impractical as such press-fit pins are difficult to remove.

SUMMARY OF THE INVENTION

Accordingly, it is a primary object of the present invention to provide a fastening system capable of interconnecting one object to another object.

It is a further object of the present invention to provide a fastening system capable of resisting and tolerating large shear loads.

It is yet another object of the present invention to provide a fastening system which inhibits slippage of one member relative to another member interconnected thereto by the fastening system.

According to one aspect of the invention, a fastening system for interconnecting and substantially inhibiting slippage between first and second members is provided. In particular, the present invention is directed to a fastening system which is capable of limiting the tilt or deflection of the fastener relative to the first and/or second members interconnected by the fastener and a nut member, especially in instances where one of the first and second members is subjected to shear loading. The fastening system of the present invention may include a fastener having a shank portion which is receivable within first and second bores of the first and second members, respectively, and a nut member for engaging the shank portion of the fastener proximate the second member. More specifically, for purposes of inhibiting tilting of the fastener relative to the first and/or second members, the nut member may include a distal, threaded portion for threadedly engaging a distal segment of the fastener shank portion, and a proximal, nose portion for abuttingly engaging a proximal segment of the fastener shank portion.

In order to achieve such abutting or frictional (e.g., tight) engagement between the inner wall of the nose portion and the proximal segment of the fastener shank portion, at least a proximal portion of the inner wall of the nose portion is threadless (e.g, smooth), as is at least the proximal segment of the fastener shank portion. In this regard, the inner diameter of the proximal part of the nose portion, as defined by the inner wall of the nose portion, is less than about 0.002 inches greater than the diameter of the proximal segment of the shank portion.

In one embodiment, at least a portion of the nose portion is positionable within the second bore such that an outer wall of the nose portion is in abutting relation to the second bore wall which defines the second bore of the second member. In this regard, the nose portion enhances the resistance by the nut member (e.g., reactive forces on the fastener shank portion by the nut member) to shear loading of one of the first and second members. In addition, the length of abutting engagement between the proximal segment of the fastener shank portion and the proximal part of the nose portion may be selected to further enhance the effect of the nose portion against deflection or tilting of the fastener relative to the first and/or second members.

In another aspect, the present invention for interconnecting and substantially inhibiting slippage between the first and second member may be used in combination with a fastening system for accommodating misalignments between the first and second bores of the first and second members, respectively, and/or a locking apparatus for substantially inhibiting displacement (e.g., rotational, axial) of the fastener relative to the first and/or second members interconnectable thereby. In one embodiment, under circumstances where the first and second bores of the first and second members, respectively, are misaligned relative to each other, first and second washers may be positionable within the first bore and about the shank portion of the fastener, proximal the nose portion of the nut member, to accommodate such a misalignment. In this regard, an inner wall of the first washer may be slidably engagable with the fastener shank portion and an outer wall of the second washer may be slidably engagable with the bore wall of one of the first bore and a tubular insert positionable within the first bore.

In another embodiment, the fastening system for interconnecting and substantially inhibiting slippage between the first and second members due to shear loading of one of the first and second members may be used in combination with a locking apparatus, which limits displacement (e.g., rotation, axial) of the fastener relative to the first and/or second members. The locking apparatus, positionable proximal the nut member and, specifically, the nose portion, is capable of substantially inhibiting or limiting displacement of the fastener relative to the first member as the locking apparatus interconnects the fastener and the first member. In this regard, the locking apparatus may include a locking member which is insertable within the first bore of the first member, the locking member having a elastically deformable upper portion (e.g., snap ring) and a leg extending distally from and normal to the elastically deformable upper portion. For purposes of engaging the fastener and first member, the elastically deformable upper portion is selectively receivable within an annular groove or channel located in a proximal portion of the first bore of the first member, and a distal portion of the leg is engagable to a proximal portion (e.g., head) of the fastener in a male-female fashion. The locking member may also include a tab which extends radially outwardly relative to a center portion of the elastically deformable upper portion. Such a tab may be selectively engagable with at least one slot associated with the annular groove. In an alternative embodiment, the annular groove and slot associated therewith may be located in a tubular insert (e.g., spool) which is positionable within the first bore of the first member.

BRIEF DESCRIPTION OF THE DRAWINGS

FIGS. 2A–2B are perspective views of the first and second washers of the fastening system illustrated in FIG. 1.

FIGS. 3A–3B are cross-sectional views of the first and second washers illustrated in FIGS. 2A–2B, respectively.

FIG. 11 is an exploded view of a locking system embodying the features of the present invention, the locking system being capable of substantially inhibiting displacement of the fastener relative to the first and/or second members.

FIG. 20 is an exploded view of a fastening system embodying features of the present invention.

DETAILED DESCRIPTION

FIGS. 1–20 illustrate a fastening system embodying the features of the present invention. For ease of description, in the discussion of the fastening apparatus, the term "distal" refers to the direction toward the support structure (e.g., second member) to which a first member will be interconnected via the fastening apparatus. Correspondingly, the term "proximal" refers to the direction away from the second member, toward the first member.

Figure 1:
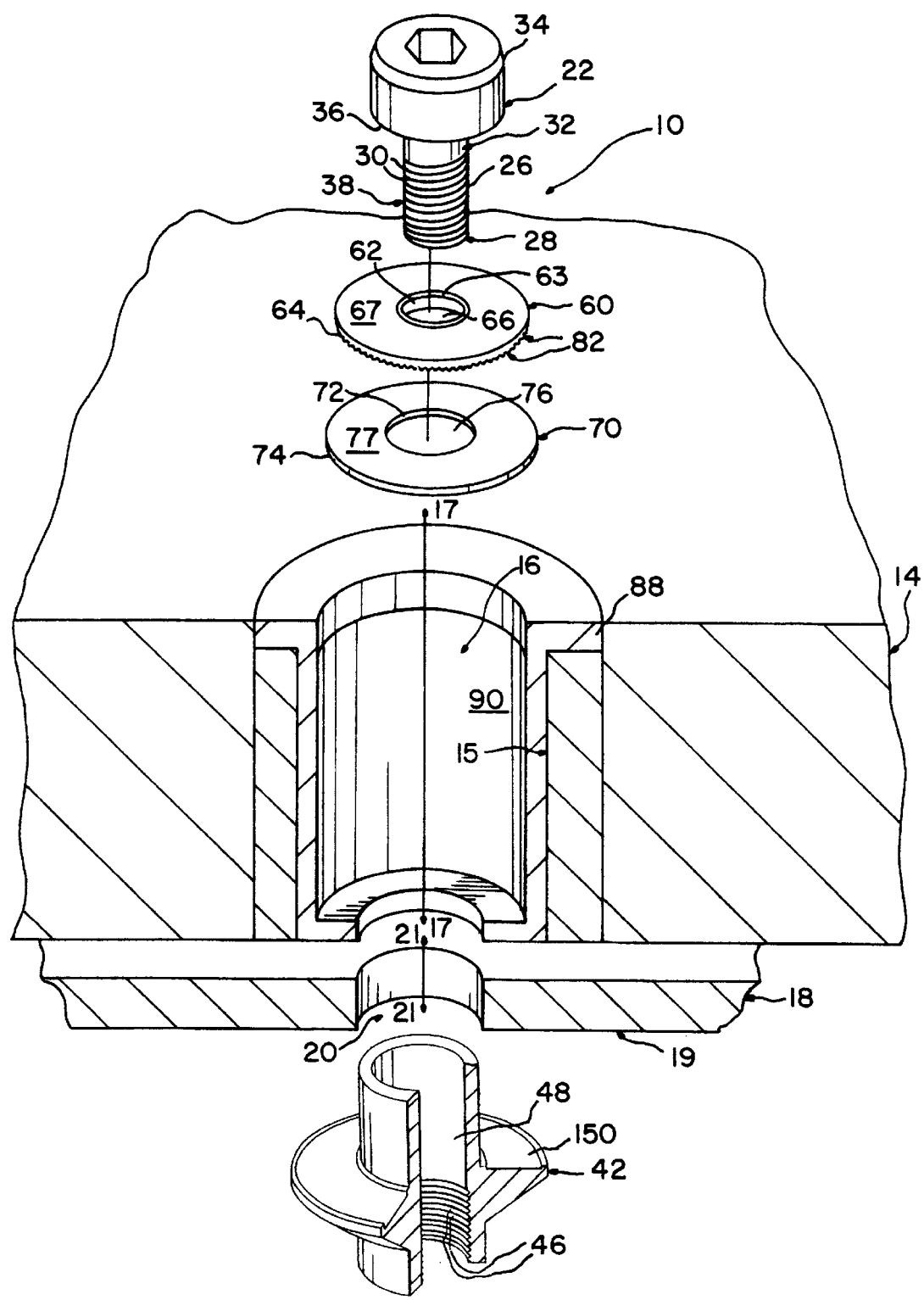
FIG. 1 is an exploded view of a fastening system embodying features of the present invention.

Referring to FIG. 1, in one aspect of the present invention, for purposes of interconnecting or fastening first and second members 14, 18 (e.g., interconnecting a panel to a support structure) in abutting relation, the fastening apparatus 10 of the present invention generally comprises a fastener 22 (e.g., bolt) and a nut member 42 engagable thereto. The fastener 22 may be configured such that at least a portion of the fastener, specifically, a distal end 28 of a shank portion 26, is insertable into and/or receivable within the first and second bores 16, 20 of the first and second members 14, 18, respectively. In this regard, upon insertion of at least the distal end 28 of the fastener 22 into and/or through the first and second bores 16, 20 of the first and second members 14, 18, respectively, the nut member 42 may engage at least the distal end 28 of the fastener 22 proximate at least a distal surface 19 of the second member 18 to interconnect the first and second members 14, 18. In one embodiment, at least the distal end 28 of the fastener 22 and the nut member 42 comprise threads such that the nut member 42 is threadedly engagable with at least the distal end 28 of the fastener 22 to fasten the first member 14 to the second member 18. As illustrated in FIG. 1, a substantial segment of the shank portion 26 of the fastener 22 includes male thread segments 30 which are engagable with spiral female thread segments 46 formed in the inner wall 48 of the nut member 42.

Figure 5:
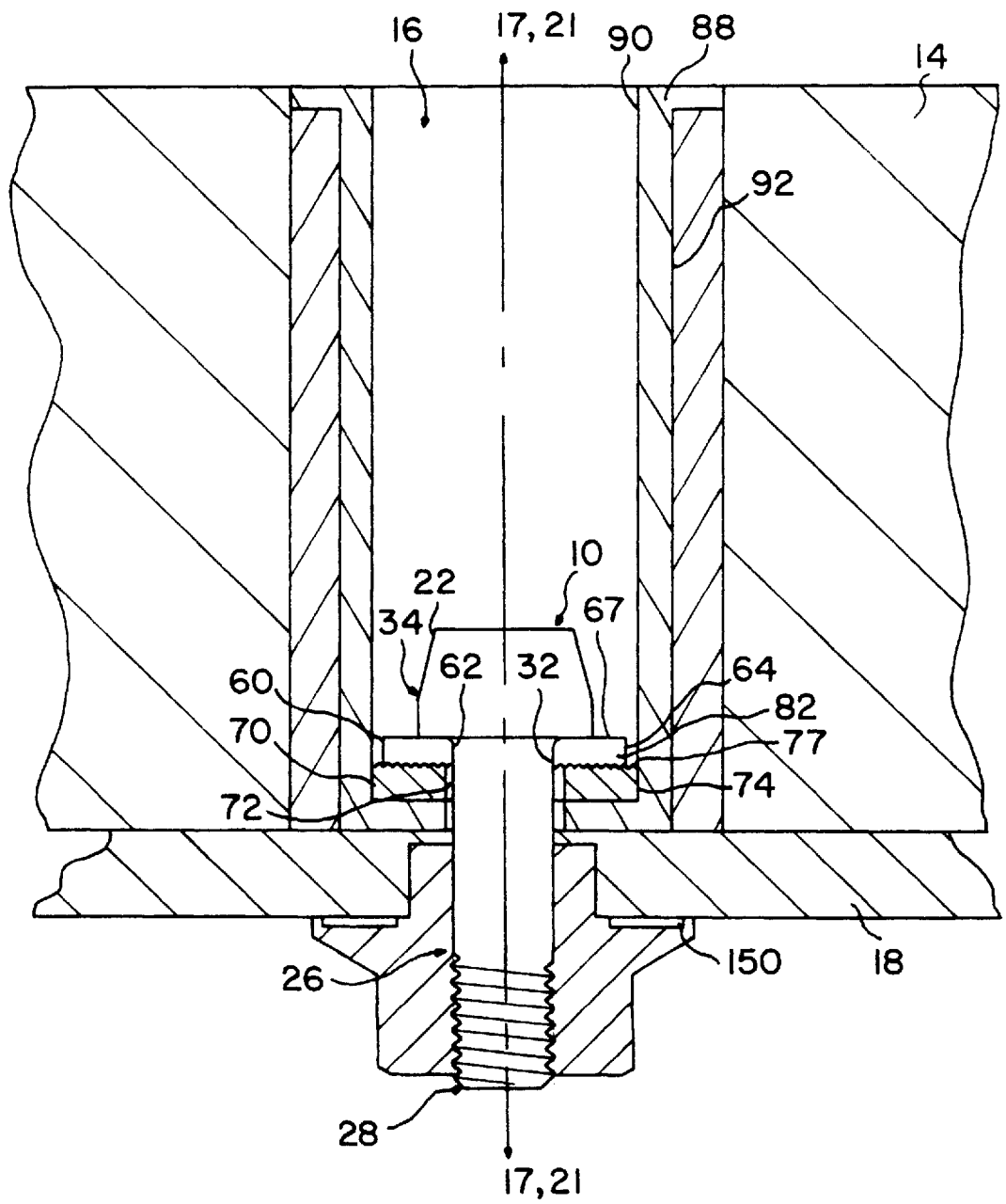
FIG. 5 is a section view of the fastening system illustrated in FIG. 1 interconnecting first and second members where the first and second bores of the first and second members are radially aligned relative to each other.

For purposes of receiving at least the distal end 28 of the fastener 22 (e.g., bolt) to interconnect the first and second members 14, 18, the first and second members 14, 18 may be positioned relative to one another such that the first and second bores 16, 20 of the first and second members 14, 18 overlap each other. Ideally, for purposes of fastening the first and second members 14, 18 together, the first and second bores 16, 20 of the first and second members 14, 18 completely overlap each other. In this regard, the first and second bores 16, 20 may be positioned relative to one another such that first and second longitudinally extending central axes 17, 21 of the first and second bores 16, 20, respectively, are substantially coincident (e.g., ±0.002 inches). As such, and as shown in FIG. 5, at least the distal end 28 of the fastener 22 may be inserted into the first and second bores 16, 20 of the first and second members 14, 18 and engaged with the nut member 42 to secure the first and second members 14, 18 together.

However, in some instances, the first and second central axes 17, 21 of the first and second bores 16, 20, respectively, are misaligned or radially displaced relative to each other (i.e., not substantially coincident). Such misalignments between the first and second bores 16, 20 can occur in instances where the first and second bores 16, 20 are not match-drilled (e.g., where the first member 14 is a replacement panel to be interchanged with an existing member and fastened to a second member 18 (e.g., a support structure)). In order to obviate the need for match-drilled bores and to facilitate interchangeability of such panels while securely interconnecting the first and second members 14, 18, the fastening apparatus 10 may also include first and second washers 60, 70. In this regard, match drilling is obviated as the first and second washers 60, 70 accommodate misalignments between the first and second bores 16, 20 which may result in instances where match-drilling is not utilized. The first and second washers 60, 70 each include inner walls 62, 72 and outer walls 64, 74, respectively. More specifically, and as illustrated in FIGS. 2A–2B and 3A–3B, the inner and outer walls 62, 64 of the first washer 60 are concentric and define inner and outer diameters, $D_i$, $D_o$, of the first washer 60. Similarly, the inner and outer walls 72, 74 of the second washer are concentric and define inner and outer diameters, $d_i$, $d_o$, of the second washer 70. The inner walls 62, 72 of the first and second washers 60, 70, respectively, define a centrally located aperture 66, 76 in the first and second washers 60, 70, respectively, such that the first and second washers 60, 70 are positionable about the shank portion 26 of the fastener 22, within the first bore 16. For purposes of enhancing the interconnection of the first and second members 14, 18 via the fastener 22 and nut member 42, the first washer 60 may be proximally positioned relative to the second washer 70, the second washer being distal the first washer 60 and proximal the second member 18, as shown in FIGS. 1, 4A–4C and 5. In this regard, the first washer 60 is frictionally engagable with the second washer 70 about the shank portion 26 of the fastener 22, within the first bore 16 and proximal the second member 18.

Figure 4A:
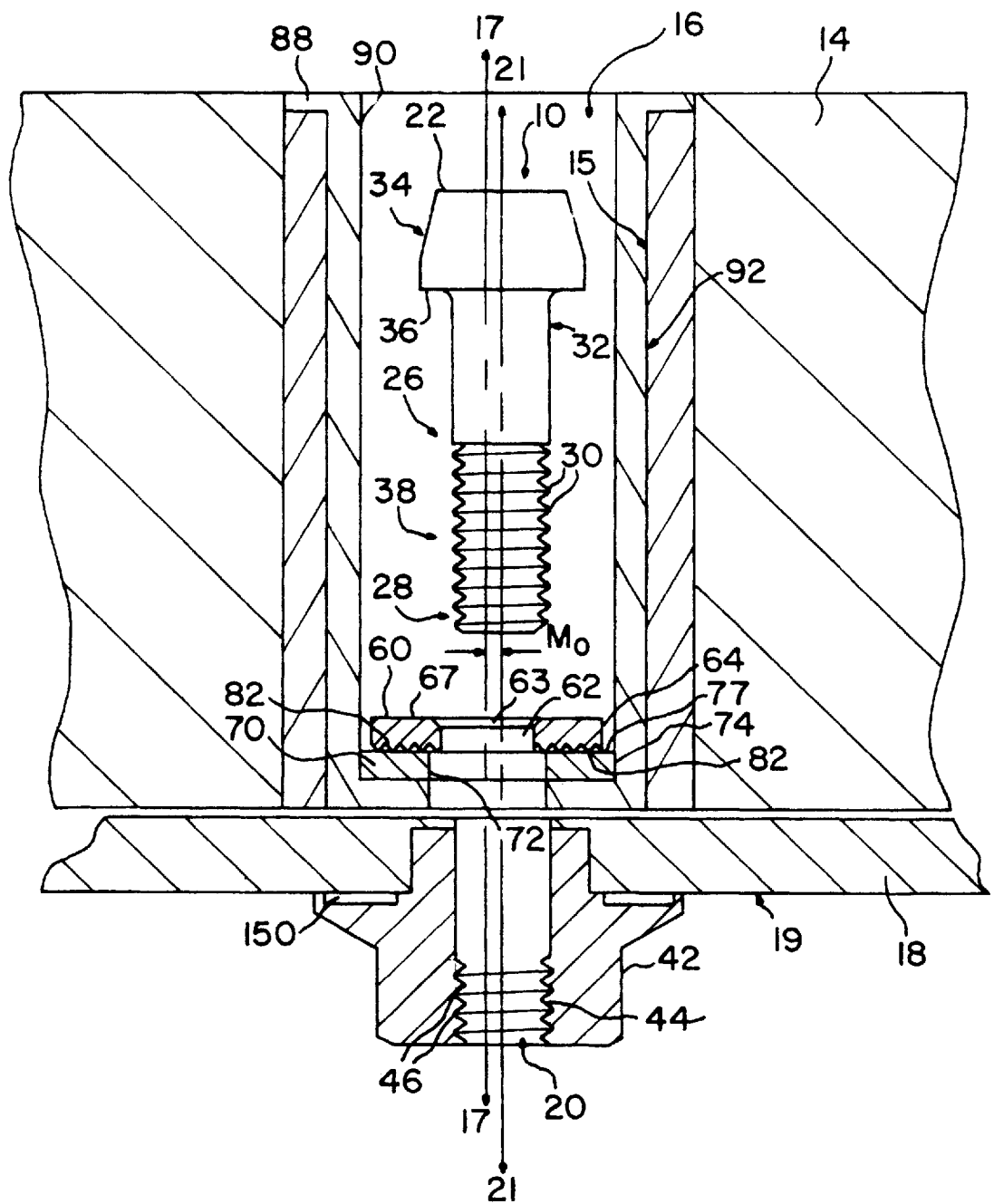
FIG. 4A is a section view of the fastening system illustrated in FIG. 1, showing the fastening system for accommodating misalignments prior to engagement of the fastener and the nut member via the radially misaligned first and second bores of the first and second members.
Figure 4B:
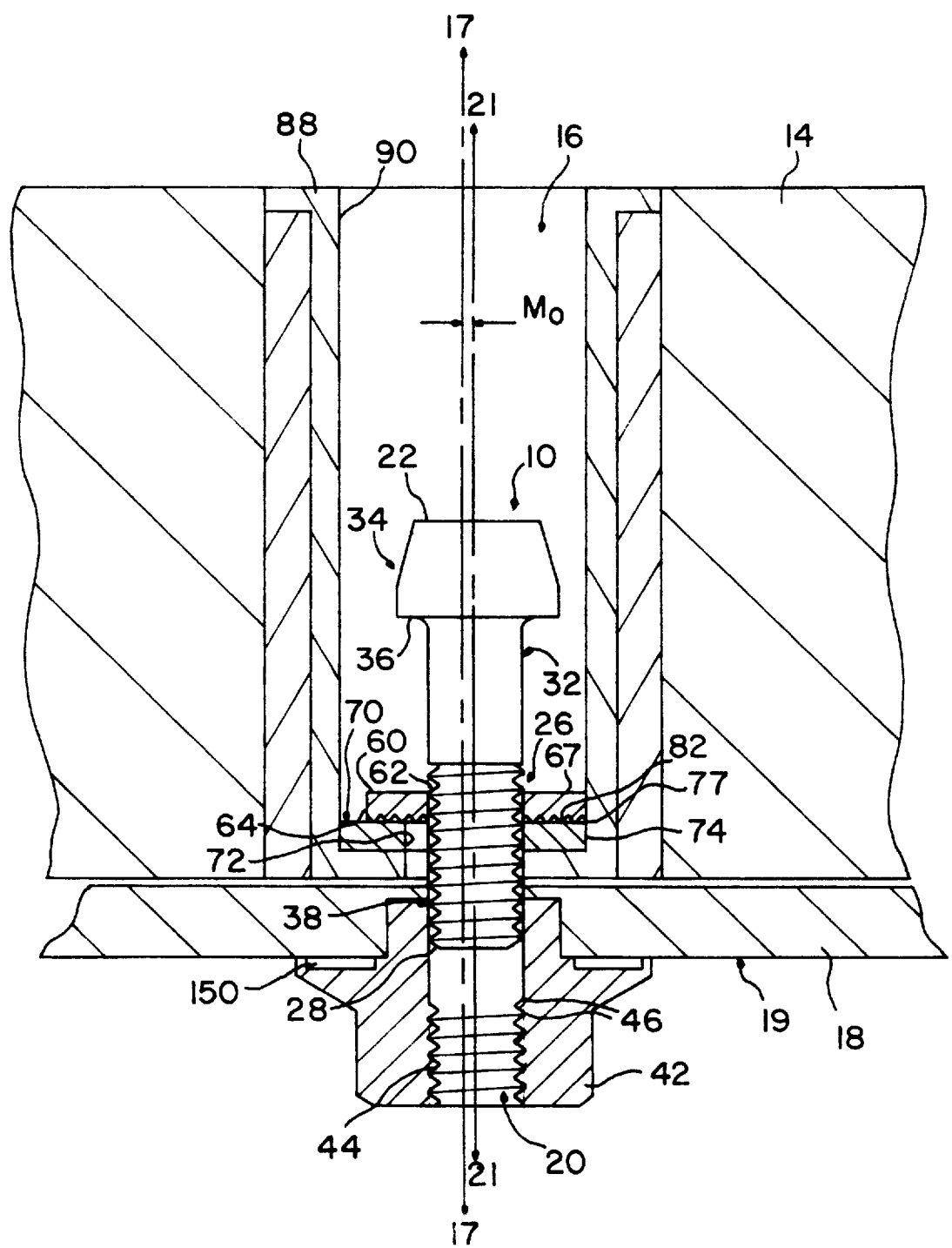
FIG. 4B is a section view of the fastening system illustrated in FIG. 1, showing the fastener engaging the nut member of the fastening system for accommodating misalignments.
Figure 4C:
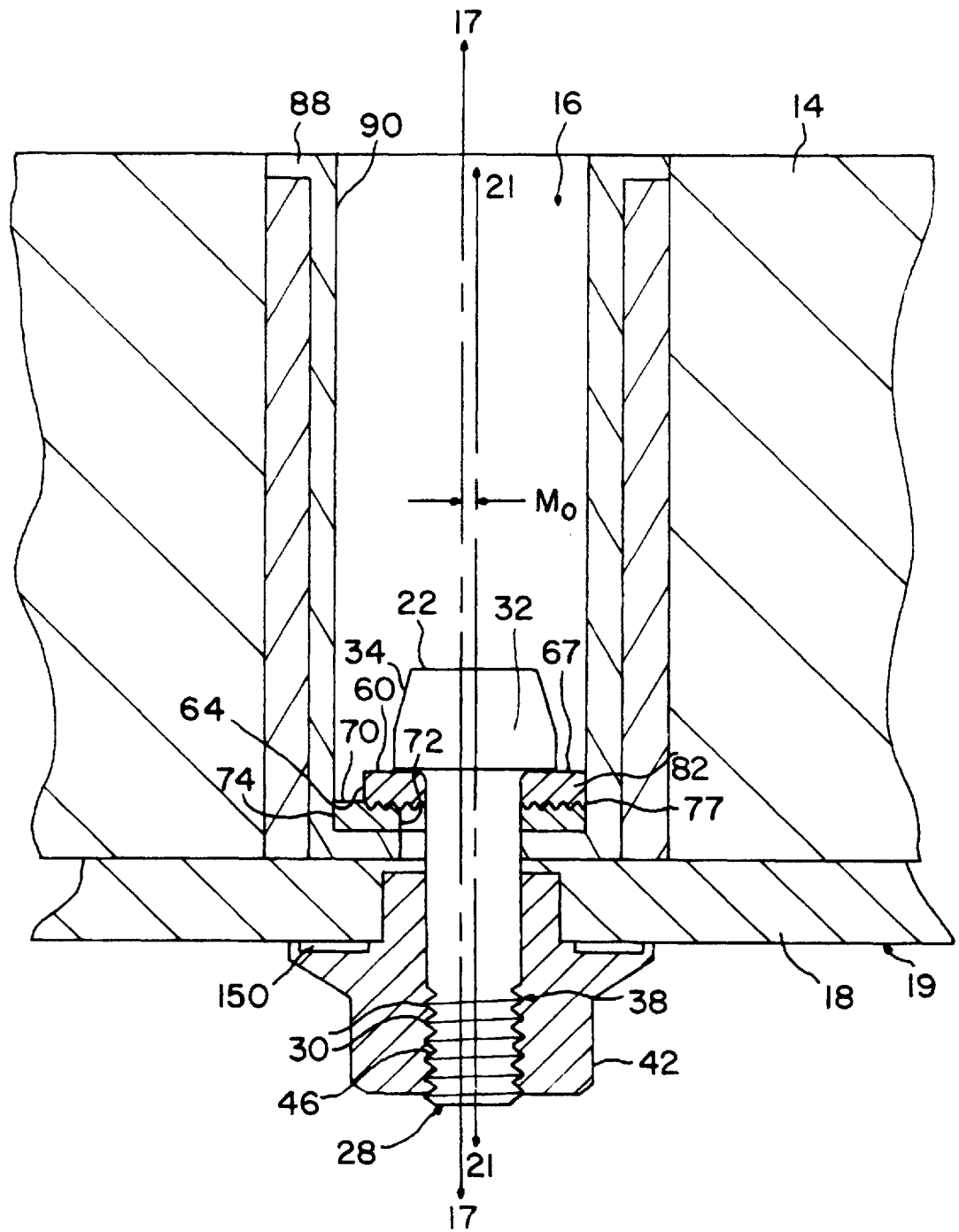
FIG. 4C is a section view of the fastening system illustrated in FIG. 1, showing the fastening system accommodating radial misalignments between the first and second bores of the first and second members while interconnecting the first and second members.

In one embodiment, in order to provide a fastening apparatus 10 capable of accommodating misalignments while being capable of tolerating large shear loads, the inner wall 62 of the first washer 60 is slidably and/or abuttingly engagable with a proximal segment 32 of the fastener shank portion 26 about a perimeter of the inner wall 62 of the first washer 60. Correspondingly, the outer wall 74 of the second washer 70 is slidably interconnectable and/or engagable with a bore wall of the first bore 16 about a perimeter of the outer wall 74 of the second washer 70. In instances where, for example, the first member 14 is a honeycomb panel, which is commonly used in spacecraft applications, to be fastened to a support structure (e.g., the second member 18), a spool insert 88 may be used to provide enhanced shear support to the honeycomb panel, as shown in FIGS. 4A–4C. The spool insert 88 may be positioned within the first bore 16 of the first member 14 such that an outer wall 92 of the spool insert 88 abuttingly engages the bore wall 15 of the first bore 16, as shown in FIGS. 1 and 4A–4C. In this regard, the outer wall 74 of the second washer 70 is slidably engagable with and in abutting relation to the inner wall 90 of the spool insert 88 about a perimeter of the outer wall 74. Thus, the first and second washers 60, 70 accommodate misalignments between the first and second bores 16, 20, and interconnect a proximal portion of the fastener shank portion 26 to the bore wall 15 of the first bore 16. Alternatively, where a spool insert 88 is not used to enhance the shear loading capabilities of the first member 14, the outer wall 74 of the second washer 70 may directly slidably engage the bore wall 15 of the first bore 16 (not shown).

For purposes of accommodating misalignments in the first and second bores 16, 20, the first and second washers 60, 70 may be configured and/or sized accordingly. In particular, in order to slidably and tightly engage the inner wall 90 of the spool insert 88 while accommodating a misalignment between the first and second bores 16, 20, the second washer 70 may have an outer diameter, $d_o$, and an inner diameter, $d_i$, greater than the outer diameter, $D_o$, and inner diameter, $D_i$, of the first washer 60. In this regard, the inner diameter, $d_i$, of the second washer 70 may be greater than a diameter of the shank portion 26 of the fastener 22, and the second washer 70 may have an outer diameter, $d_o$, which is between about 0.0005 inches and about 0.002 inches less than the diameter of the spool insert 88, as defined by the inner wall 90 of the spool insert 88. In addition, the inner diameter, $D_i$, of the first washer 60 may be slightly greater than a diameter of the proximal segment 32 of the shank portion 26 of the fastener 22 such that the inner wall 62 of the first washer 60 is slidably and tightly engagable with the proximal segment 32 of the shank portion 26. In this regard, the first washer 60 may have an inner diameter, $D_i$, which is between about 0.0005 inches and about 0.002 inches greater than the diameter of the shank portion 26 of the fastener 22. The outer diameter, $D_o$, of the first washer 60 is less than the diameter of the spool insert 88, as defined by the inner wall 90, and, in a preferred embodiment, is less than the outer diameter, $d_o$, of the second washer 70. In this regard, the fastening apparatus 10 accommodates misalignments between the first and second bores 16, 20 as the first washer 60 aligns with the shank portion 26 of the fastener 22 and the second bore 20 in the second member 18 for receipt of at least the distal end 28 of the fastener 22 in the nut member 42, and the second washer 70 aligns with the first bore 16 in the first member 14.

In one embodiment, where the first and second central axes 17, 21 of the first and second bores 16, 20, respectively, are radially displaced relative to one another by a misalignment offset, the inner diameter, $d_i$, and the outer diameter, $d_o$, of the second washer 70 are greater than the inner diameter, $D_i$, and the outer diameter, $D_o$, of the first washer 60, respectively. In a preferred embodiment, in order to provide an enhanced capability to accommodate misalignments between the first and second bores 16, 20, the first washer 60 may have an outer diameter, $D_o$, which is less than the diameter of the first bore 16, as defined by the bore wall 15, by an amount substantially equal to twice the amount of misalignment (e.g., twice the misalignment offset). Correspondingly, the second washer 70 may have an inner diameter, $d_i$, which is greater than the diameter of the shank portion 26 by an amount substantially equal to twice the amount of misalignment (e.g., twice the misalignment offset, $M_o$). For example, where the central axis 17 of the first bore 16 is radially displaced (i.e., misaligned) about 0.03 inches relative to and/or from the central axis 21 of the second bore 20, the first washer 60 may have an outer diameter, $D_o$, as defined by the outer wall 64, which is at least about 0.06 inches less than the diameter of the first bore 16, as defined by the bore wall 15. The second washer 70 may have an inner diameter, $d_i$, as defined by the inner wall 72, which is at least about 0.06 inches greater than the diameter of the shank portion 26 of the fastener 22. Accordingly, in this embodiment, a misalignment capability of about 0.030 inches radial is provided through the use of the first and second washers 60, 70.

In any event, the outer diameter, $D_o$, of the first washer 60, as defined by the outer wall 64, should be greater than the inner diameter, $d_i$, of the second washer 70, as defined by the inner wall 72 such that the first and second washers 60, 70 may frictionally engage and cooperate with each other, as well as with the first bore 16, and specifically, the inner wall 90 of the spool insert 88, to accommodate misalignments between the first and second bores 16, 20. Furthermore, in order to retain or capture the first and second washers 60, 70 within the first bore 16, the fastener 22 may have a head 34 on a proximal end of the fastener 22, as illustrated in FIGS. 1 and 4C. In this regard, a diameter of the head 34 should be greater than the inner diameter, $D_i$, of the first washer 60 to facilitate an abutting (e.g., bearing) interface between a proximal surface 67 of the first washer 60 and a distal surface 36 of the head 34.

For purposes of providing a fastening apparatus 10 capable of tolerating large shear loads, at least one of the first and second washers 60, 70 may further include at least one serration (e.g., projection) for engaging the other of the first and second washers 60, 70. As illustrated in FIGS. 2A–2B and 3A–3B, a distal surface 68 of the first washer 60 may include a plurality of serrations 82 (e.g., pyramidical, conical, frustoconical, hemispherical, irregular-shaped teeth) for engaging and penetrating into the proximal surface 77 of the second washer 70. Such serrations 82 may engage and penetrate into the proximal surface 77 of the second washer 70 as the fastener 22 is threaded or "tightened" (e.g., torqued) relative to the nut member 42. Such serrations 82 generally project distally from the distal surface 68 of the first washer 60, and may be configured to facilitate penetration into or indentation of the proximal surface 77 of the second washer 70. In addition, to further facilitate penetration into or indentation of the proximal surface 77 of the second washer 70, the second washer 70 may have a hardness and/or yield strength which is less than the hardness and/or yield strength of the first washer 60 and serrations 82 thereon. In one embodiment, the first washer 60 and serrations 82 thereon are fabricated from a high yield strength material (e.g., steel, titanium, beryllium copper) while the second washer 70 is fabricated from a lower yield strength material (e.g., aluminum, soft titanium, copper, plastic). Thus, upon tightening (e.g., torquing) of the fastener 22 relative to the nut member 42, the serrations 82 on the distal surface 68 of the first washer 60 are driven into the proximal surface 77 of the second washer 70 to create an interface capable of carrying high shear loads, regardless of whether the first and second bores 16, 20 are aligned.

In an alternative embodiment (not shown), the second washer 70 may include at least one serration 82 on a proximal surface 77 of the second washer 70. In this alternative embodiment, the serrations 82 on the second washer 70 may engage and/or be otherwise driven into the distal surface 68 of the first washer 60 to enhance the shear load carrying capability of the fastening apparatus 10. In this regard, upon torquing or "tightening" of the fastener 22 relative to the nut member 42, the serrations 82 may penetrate into or otherwise deform the distal surface 68 of the first washer 60. In order to facilitate such penetration, in this embodiment, the second washer 70 may be fabricated from a high yield material, such as steel, while the first washer 60 may be fabricated from a lower yield material, such as aluminum.

For purposes of facilitating insertion of the distal end 28 of the fastener 22 into and through the aperture 66 of the first washer 60 such that the distal surface 36 of the head 34 is abuttingly engagable with the proximal surface 67 of the first washer 60, the first washer 60, and specifically, the inner wall 62 of the first washer 60, may include an annular, radially inwardly-directed (e.g., toward the aperture 66) chamfered surface 63. As illustrated in FIGS. 1, 2B and 3B, the chamfered surface 63 may extend between the inner wall 62 and the proximal surface 67 of the first washer 60. Relative to the inner wall 62, the chamfered surface 63 may be angled between about 40° and about 50°, and, in a preferred embodiment, about 45°. As such, the chamfered surface 63 is angled to allow the distal surface 36 of the head 34 to abuttingly and frictionally engage the proximal surface 67 of the first washer 60.

Substantially as described hereinabove, in order to interconnect the first and second member 14, 18 via the fastener 22 and the nut member 42, at least the distal end 28 of the fastener 22 is threadedly engagable with the nut member 42. In one embodiment, a distal segment 38 of the shank portion 26 may be threadedly engagable with the nut member 42 to secure the first member 14 to the second member 18. In this regard, at least a distal portion 44 of the nut member 42 includes threads 46 to engage the threads 30 of the fastener 26 at least within the distal segment 38 of the shank portion 26 of the fastener 22. The distal portion 44 of the nut member 42 may threadedly engage the distal segment 38, at least proximate a distal surface 19 of the second member 18. The nut member 42 may be of the standard, readily available type, or, alternatively, of the quick action type, such as those disclosed in U.S. Pat. Nos. 4,378,187, 5,118,237, 3,352,341 and 4,083,393 and the Zip Nut™, which is commercially available from Fastener Technologies, Chantilly, Va.

FIGS. 6–10 illustrate another aspect of the present invention. For purposes of substantially inhibiting slippage or relative movement between first and second interconnectable members (e.g., a panel and a support structure), one of which may be subject to large shear loads, a fastening apparatus 110 for interconnecting the first and second members 114, 118, illustrated in FIGS. 6–10, may include a fastener 122 and a nut member 142 having a nose portion 154 (which will be described in more detail hereinbelow).

Substantially as described hereinabove, according to the principles of the present invention, the first and second members 114, 118 (e.g., a panel and a support structure) are interconnectable via a fastening apparatus 110, which generally comprises a fastener 122 (e.g., bolt) and a nut member 142 engagable thereto. More specifically, in order to fasten the first member 114 to the second member 118, at least a distal end 128 of a fastener shank portion 126 may be inserted into and/or receivable within first and second bores 116, 120 of the first and second members 114, 118. Upon insertion into the bores 116, 120, at least the distal end 128 of the shank portion 126 may frictionally engage the nut member 142, and specifically, a body portion 156 of the nut member 142, to interconnect the first and second members 114, 118. In one embodiment, at least an inner wall 148 of the body portion 156 of the nut member 142 includes a plurality of spiral female thread segments 146 which are threadedly engagable with male thread segments 130 on a distal segment 138 of the fastener shank portion 126.

In one embodiment, for purposes of substantially inhibiting slippage between the first and second members 114, 118, the fastening apparatus 110, and specifically, the nut member 142, may include the nose portion 154, which is capable of abuttingly engaging a proximal portion 140 of the fastener shank portion 126 to generally inhibit tilting of the fastener 122 relative to the nut member 142, especially in instances where large shear loads are applied to one the first and second members 114, 118. In order to provide resistance and/or to react to such tilting, the nut member 142 is configured such that the nose portion 154 extends proximally from and relative to the body portion 156 of the nut member 142. Furthermore, the nose portion 154 may be sized and/or configured such that the nose portion 154 is positionable within the second bore 120 of the second member 118, in abutting relation therewith. Having the nose portion 154 engage the shank portion 126 at a proximal portion 140, within the second bore 120, enhances the reactability of the nose portion 154 to shear loading on one of the first and second members 114, 118 as less stress is imparted into the second member 118, in view of the large area of abutting engagement between the nose portion 154 and the proximal portion 140 and between the threaded distal portion 138 of the shank portion 126 which threadedly engages the body portion 156 of the nut member 142. The nose portion 154 may be annular in configuration.

Figure 7:
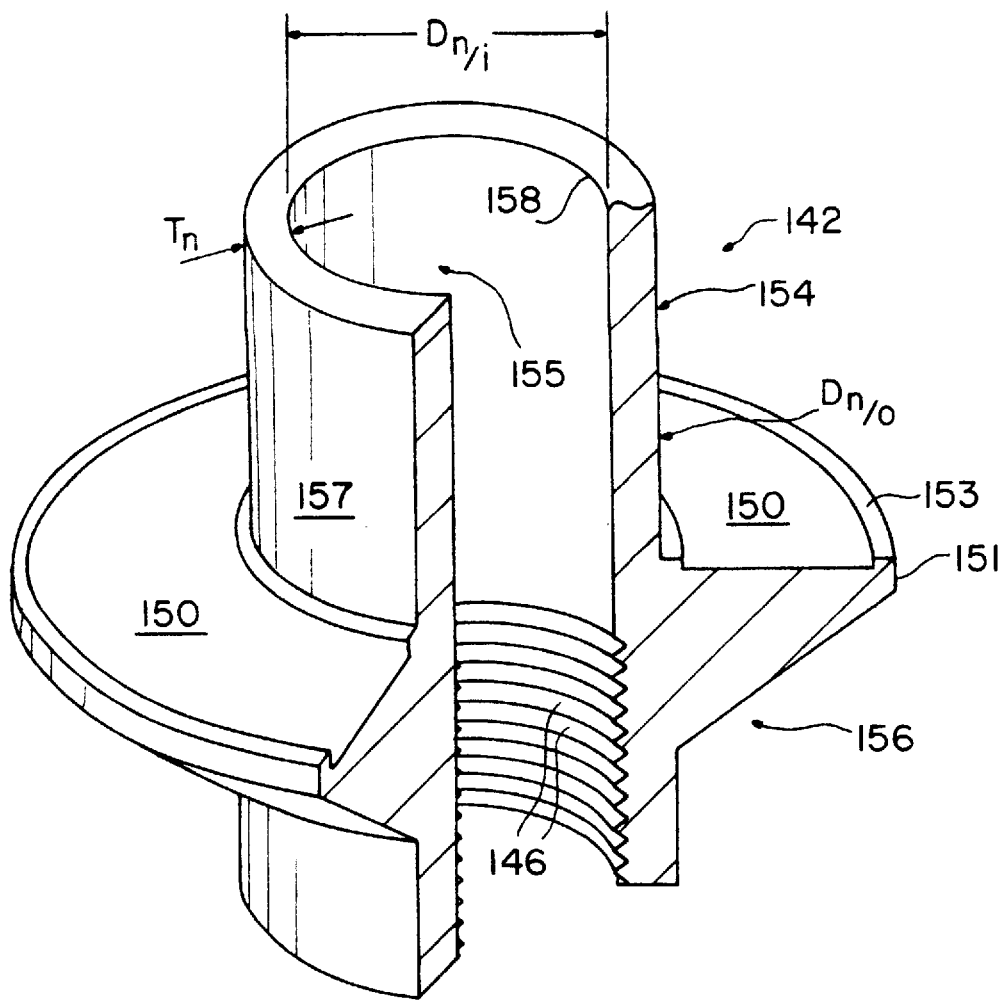
FIG. 7 is a perspective view of the nut member illustrated in FIG. 6.

Of importance, for purposes of providing a fastening apparatus 110 capable of substantially inhibiting tilting of the fastener 122 relative to the first and/or second members 114, 118, the engagement between the inner wall 158 of the nose portion 154 and the proximal portion 140 of the fastener shank portion 126 is tight (e.g., in abutting relation). In this regard, at least one of the proximal portion 140 of the fastener shank portion 126 and proximal part 155 of the inner wall 158 of the nose portion 154 is substantially smooth (e.g., threadless), as shown in FIG. 7. In one embodiment, both the proximal portion 140 of the fastener shank portion 126 and the proximal part 155 of the inner wall 158 of the nose portion 154 are smooth.

Similarly, for purposes of substantially inhibiting substantially inhibiting spinning of the nut member 142 and/or the fastening member 122 relative to the second member 118, the engagement between the outer wall 157 of the nose portion 154 and the bore wall 119 of the second member 118 should be tight. In one embodiment, shown in FIGS. 6 and 8, for purposes of enhancing the interface between the outer wall 157 of the nose portion 154 and the bore wall 119, a plurality of knurls 198 (e.g., serrations) are integrally formed on the outer wall 157 of the nose portion 154. Upon installation (e.g., press engagement) of the nut member 142 into the second member 118, such knurls 198 may be capable of pressing against the bore wall 119 of the second member 118 to substantially inhibit spinning of the nut member 142 relative to the second member 118. In an alternative embodiment (not shown), the outer wall of the nose portion and the bore wall of the second member may threadedly engage each other. In this embodiment, for purposes of enhancing the interconnection between the nut member and the second member to substantially inhibit spinning of the nut member relative to the second member, left-handed threads may be integrally formed on the outer wall of the nose portion of the nut member and the second member such that upon tightening or torquing of the fastener relative to the nut member via right-handed threads thereon, the threaded engagement between the nut member and second member is enhanced.

In order to provide such abutting engagability, the nose portion 154 may be sized to abuttingly engage both the second bore wall 119 of the second bore 120 and the proximal portion 140 of the fastener shank portion 126. In one embodiment, for a ¼ inch fastener 122, the nose portion 154 may be sized such that the diameter, $D_b$, of the second bore 120, as defined by the bore wall 119, is less than about 0.005 inches greater than the outer diameter, $D_{n/o}$, of the nose portion 154, as defined by the outer wall 157 of the nose portion 154. In a preferred embodiment, the diameter, $D_b$, of the second bore 120, as defined by the bore wall 119, is less than about 0.002 inches greater than the outer diameter, $D_{n/o}$, of the nose portion 154, as defined by the outer wall 157 of the nose portion 154. Furthermore, the nose portion 154 may be sized such that the inner diameter, $D_{n/i}$, of the nose portion 154, as defined by the inner wall 158 of the nose portion 154, is less than about 0.002 inches greater than the diameter, $D_p$, of the proximal portion 140 of the fastener shank portion 126. In a preferred embodiment, the inner diameter, $D_{n/i}$, of the nose portion 154 is between about 0.0005 inches and about 0.002 inches greater than the diameter, $D_p$, of the proximal portion 140 of the fastener shank portion 126. In this regard, the nose portion 154 tightly and abuttingly engages the proximal portion 140 of the fastener shank portion 126 to substantially inhibit tilting of the fastener 122 relative to the first and/or second members 114, 118. Furthermore, as the diameter, $D_b$, of the second bore 120, as defined by the second bore wall 119, is greater than the diameter, $D_p$, shear and bearing stresses into the second member 118 are reduced as contact stress due to shear forces (e.g., 800 lbs. per ¼ inch fastener 122) are spreadable and translatable into the second member 118 over a wider area.

Figure 9:
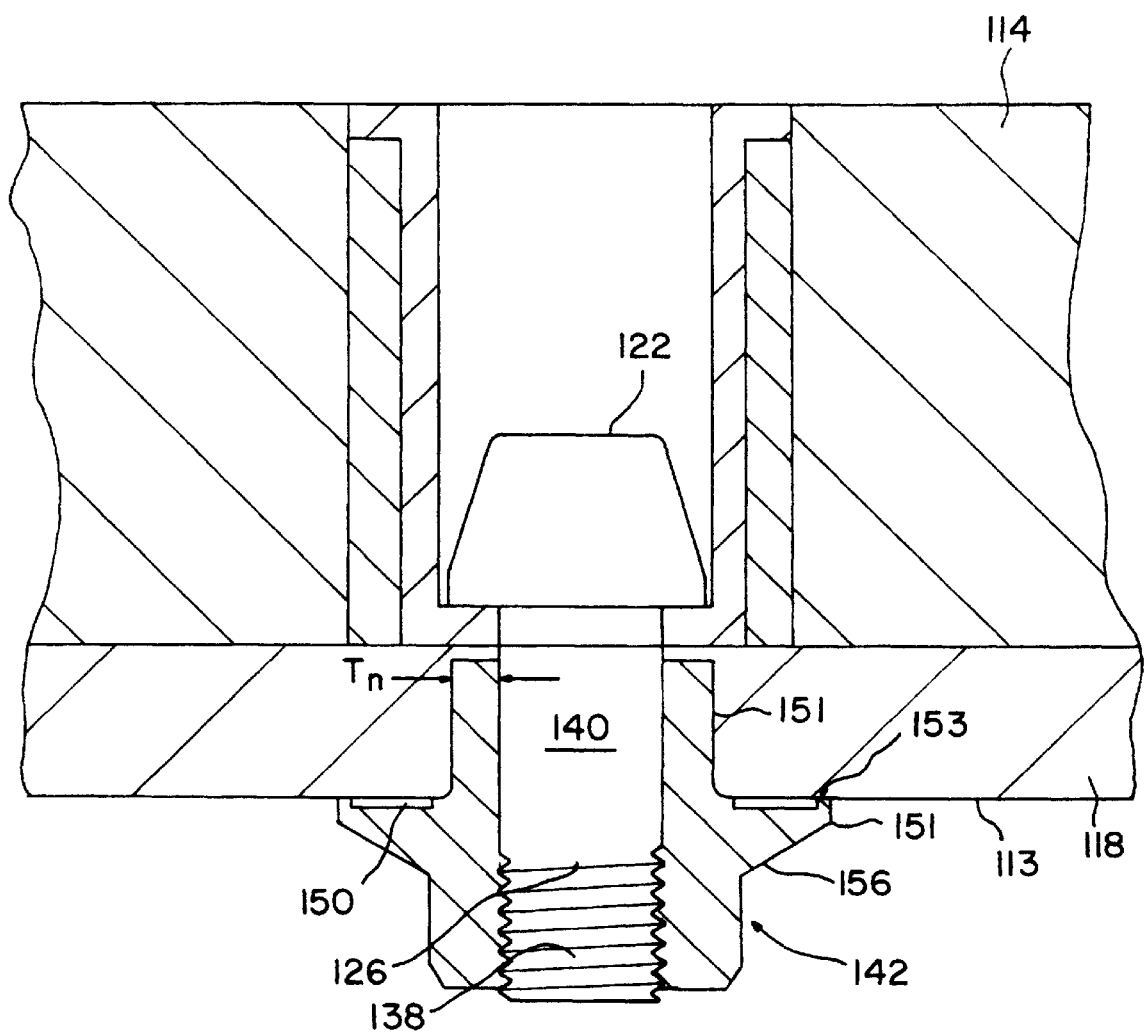
FIG. 9 is a section view of the fastening system illustrated in FIG. 6 showing the fastening system interconnecting first and second members.

For purposes of providing a fastening apparatus 110 capable of resisting and/or reacting to shear loads on, for example, the first member 114, it is generally preferable to provide a nut member 142 which tightly engages the shank portion 126 of the fastener 122, as illustrated in FIG. 9. For example, where a shear force is applied on the first member 114, reactive forces are applied by the nut member 142 to resist tilting of the fastener 122 relative to the first and/or second member 114, 118. Such reactive forces from the nut member 142, relative to the shank portion 126, are generally applied at proximal portions 140 and distal segments 138 of shank portion 126. As such, for purposes of inhibiting tilting of the fastening member 122, the present invention provides for a tight, abutting interface at least between the proximal portion 140 of the shank portion 126 and the nose portion 154 of the nut member 142.

Figure 6:
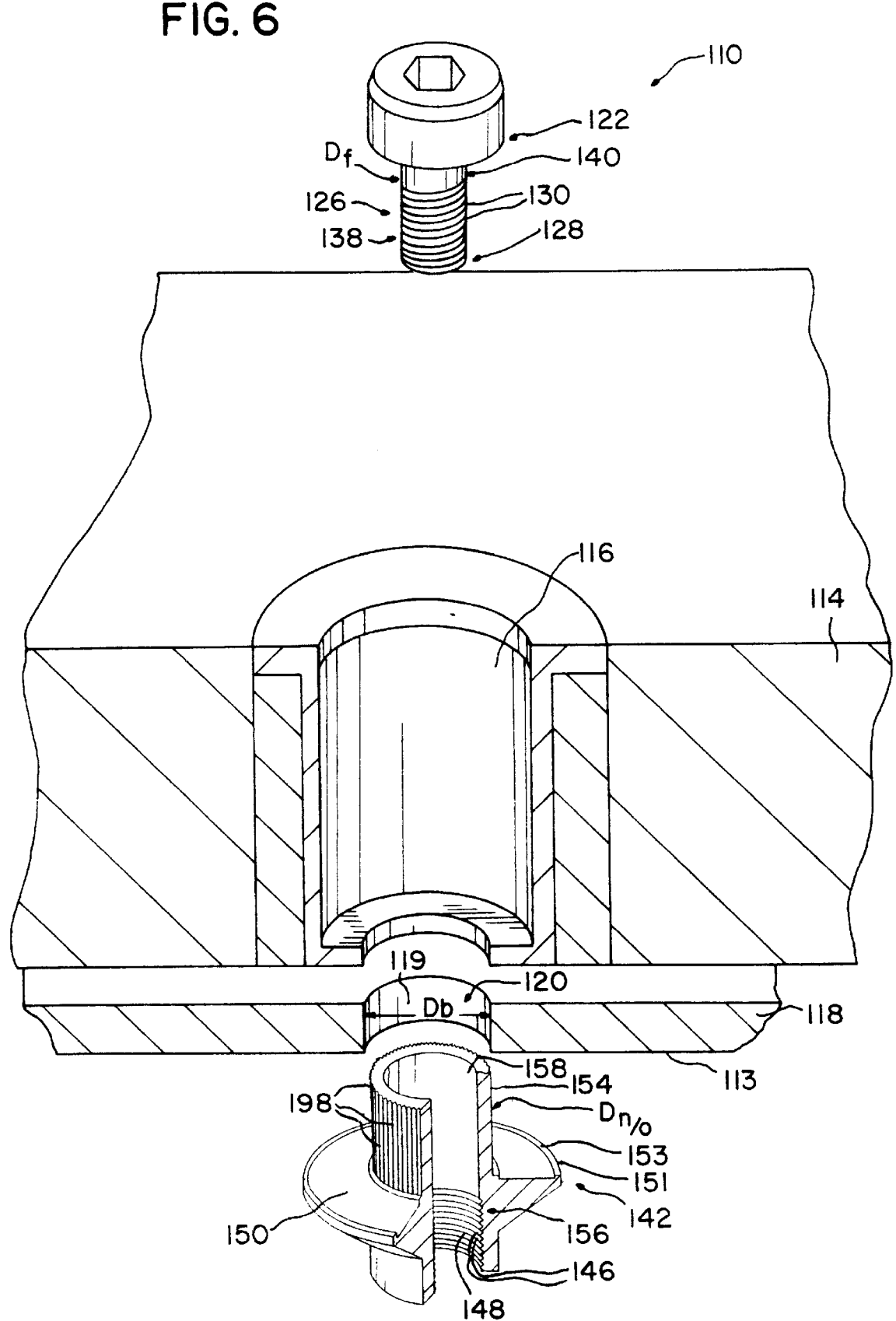
FIG. 6 is an exploded view of another fastening system embodying features of the present invention, the fastening system being capable of substantially inhibiting slippage between the first and second members due to shear loading.
Figure 8:
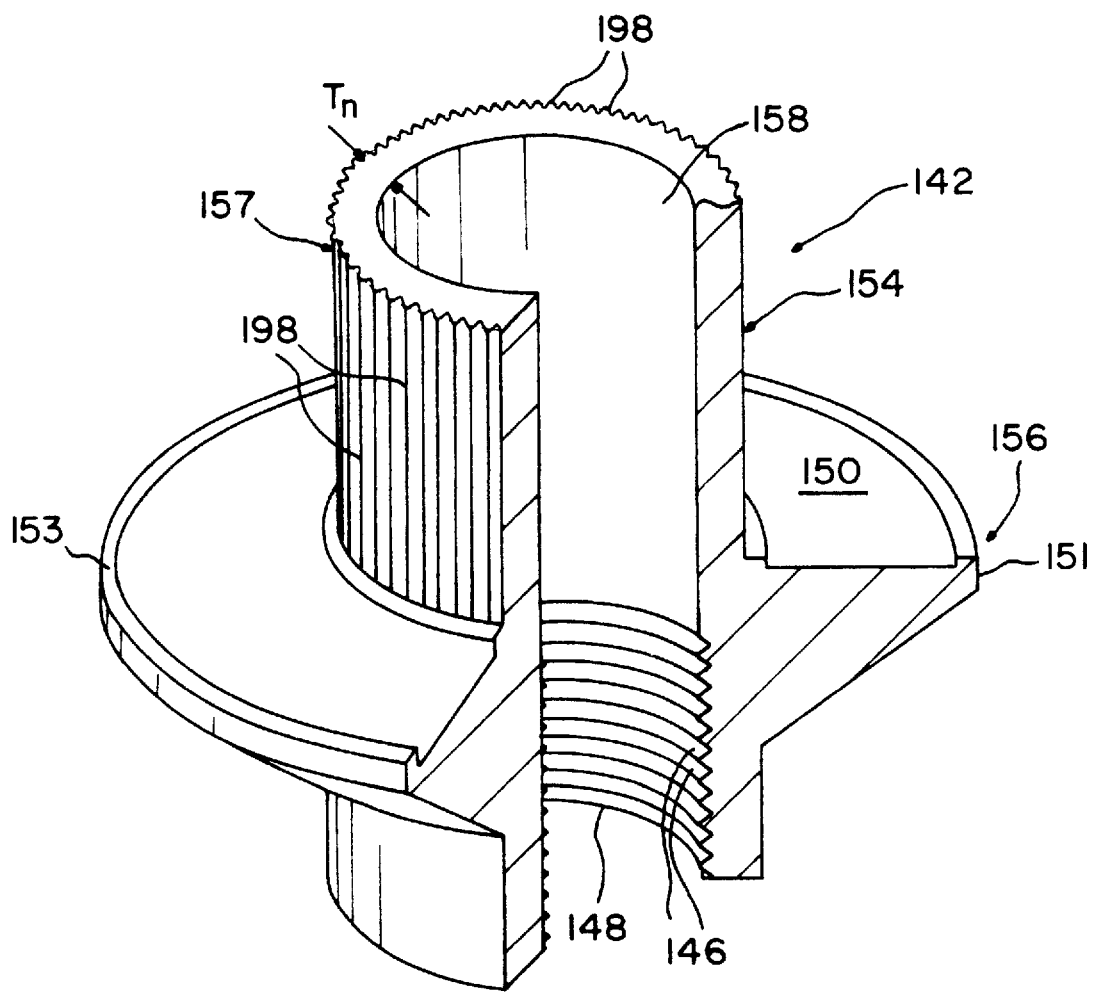
FIG. 8 is an alternative embodiment of the nut member illustrated in FIG. 6.

As illustrated in FIGS. 6–8, the body portion 156 of the nut member 142 includes female thread segments 146 formed in the inner wall 148 of the body portion 156, while the inner wall 158 of the nose portion 154 is smooth. In one embodiment, the female thread segments 146 of the body portion 156 engage the male threads 130 on the shank portion 126 of the fastener 122 and, in a preferred embodiment, such male and female thread segments 130, 146 uniformly engage each other to provide a tight interface therebetween. Of primary importance, for purposes of providing a nut member 142 capable of reacting against a shear force on one of the first and second members 114, 118, the nut member 142 is configured and sized to direct such reactant forces on areas of the fastener 122 to substantially inhibit tilting of the fastener 122 relative to the first and second members 114, 118. More specifically, as shear loads on one of the first and second members 114, 118 are translated into a proximal segment 141, proximate the head 122, of the fastener 122 via the spool 188 and the second and first washers 170, 160, reactant forces act on the fastener 122 to substantially inhibiting tilting of the fastener 122 relative to the nut member 142. Such reactant forces from the nut member 142 optimally act on the distal segment 138 of the fastener 122 and on the proximal portion 140 of the fastener shank portion 126. In this regard, and as shown in FIG. 10, the present invention contemplates providing a nut member 142 which is optimally sized such that the length, $L_1$, between upper and lower areas $159_a$ and $159_b$ of the nut member 142 from which such reactant forces act on the proximal portion 140 and the distal segment 138 of the fastener 122, respectively, is larger than the length, $L_2$, between the area in which shear loads are translated into the fastener 122 (e.g., proximal segment 141 of the fastener shank portion 126) and the upper area $159_a$ of the nut member 142 from which a reactant force acts on the proximal portion 140 of the fastener shank portion 126.

In order to react to large shear loads applied on the first and/or second members 114, 118, the nose portion 154 of the nut member 142 may be fabricated from a high yield strength material having a high modulus of elasticity, such as steel, titanium and beryllium copper. In one embodiment of the invention, illustrated in FIG. 10, the length, $L_n$, of the nose portion 154 for abuttingly engaging the fastener 122, is at least about one-half the diameter, $D_f$, of the shank portion 126 of the fastener 122. A length of the nose portion 154 may also be less than or equal to the thickness of the second member 118, the thickness of the second member being defined by proximal and distal surfaces of the second member 118. For example, where the second member 118 has a thickness of 0.25 inches, the length of the nose portion 154 may be about 0.245 inches. In addition, in one embodiment, illustrated in FIGS. 9–10, where the fastener 122 is a ¼ inch fastener, the nose portion 154 has a thickness, $T_n$, of 0.060 inches.

As illustrated in FIGS. 6 and 9, the nut member 142 is securable to a distal surface 113 of the second member 118. More specifically, in one embodiment, the nose portion 154 may be positioned within the second bore 120 of the second member 118 and a proximal surface 153 of the body portion 156 may abuttingly engage the distal surface 113 of the second member 118. For purposes of enhancing the attachment of the nut member 142 to the second member 118 while optimizing the area of interface between the distal surface 113 and the proximal surface 153, the nut member 142 may be chemically bonded to the distal surface 113 of the second member 118. In one embodiment, an annular recess 150 may be formed in the proximal surface 153 of an annular flange portion 151 of the body portion 156. An epoxy adhesive (e.g., EA9394, available from Hysol), may be applied within the recess 150 to securely interconnect the nut member 142 to the distal surface 113 of the second member 118. In this regard, for purposes of enhancing the engagement between the nut member 142 and the second member 118, only a small area of the proximal surface 153 of the flange portion 151 engages the distal surface 113 of the second member 118, while the area of the recess 150, relative to the proximal surface 153 of the flange portion 151, is optimized such that the proper adhesive thickness will be maintained within the recess 150. Alternatively, the nut member 142 may be attached to the second member 118 via mechanical fasteners, such as screws, bolts, rivets, pins, clamps etc. The body portion 156 of the nut member 142 may include a quick action nut system, such as those disclosed in U.S. Pat. Nos. 4,378,187, 5,118,237, 3,352,341 and 4,083,393 and the Zip Nut™, which is commercially available from Fastener Technologies, Chantilly, Va., or, alternatively, may comprise a standard nut.

Figure 10:
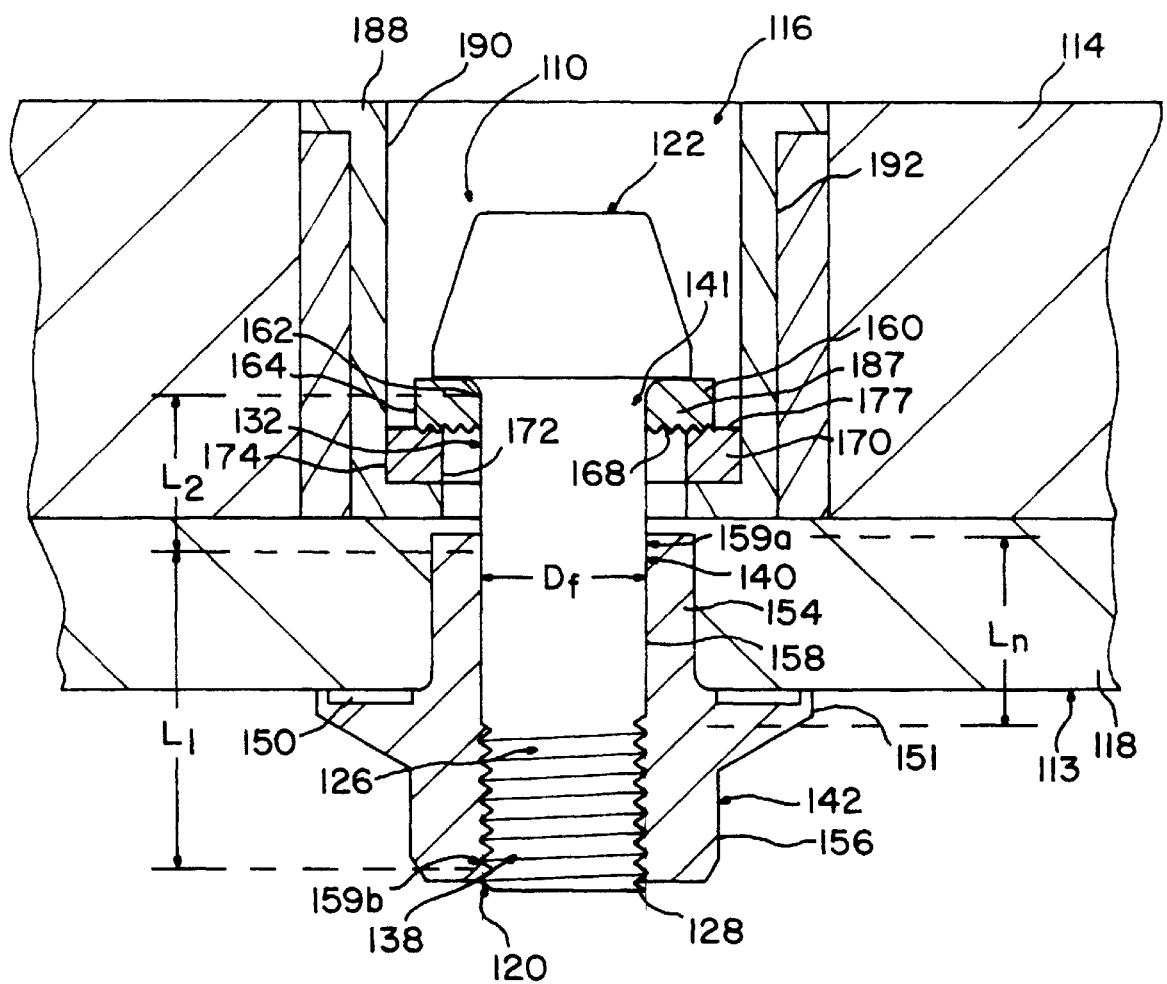
FIG. 10 is a section view of the fastening system illustrated in FIG. 6 used in combination with the fastening system illustrated in FIGS. 1–5 for accommodating misalignments between the first and second bores of the first and second members.

The fastening apparatus 110, shown in FIGS. 6–9, may further include first and second washers 160, 170, as illustrated in FIG. 10. Such washers 160, 170 may be especially useful in instances where the first and second bores 116, 120 of the first and second members 114, 118 not radially alignable with each other (e.g., the central axes 117, 121 of the first and second bores 116, 120 are not substantially coincident with each other (e.g., ±0.002 inches)). Substantially as described hereinabove, the fastening apparatus 110 may be used in conjunction with the first and second washers 160, 170 to accommodate misalignments between the first and second bores 116, 120 while substantially inhibiting slippage between the first and second members 114, 118 due to large shear loads. In this regard, first and second washers 160, 170 may be positioned about the shank portion 126, within the first bore 116, such that the first and second washers 160, 170 are proximally positioned relative to the nose portion 154 of the nut member 142 to engage a proximal segment 132 of the fastener shank portion 126. Each of the first and second washers 160, 170 may include concentric inner walls 162, 172, and outer walls 164, 174, respectively.

More specifically, in order to provide a fastening apparatus 110 capable of accommodating misalignments while being capable of substantially inhibiting slippage of the first member 114 relative to the second member 118, the inner wall 162 of the first washer 160 is slidably and/or abuttingly engagable with a proximal segment 132 of the fastener shank portion 126 about a perimeter of the inner wall 162 of the first washer 160. In addition, the outer wall 174 of the second washer 170 is slidably interconnectable or engagable with a bore wall of the first bore 116 about a perimeter of the outer wall 174 of the second washer 170. Substantially as noted hereinabove, in instances where, for example, the first member 114 is a honeycomb panel, which is commonly used in space-based structures due to its weight and strength characteristics, a spool insert 188 may be used to enhance attachment of the honeycomb panel. Such a spool insert 188 may be positioned within the first bore 116 of and bonded to the first member 114 such that an outer wall 192 of the spool insert 188 abuttingly engages the bore wall of the first bore 116. In this regard, the outer wall 174 of the second washer 170 is slidably and/or abuttingly engagable with the inner wall 190 of the spool insert 188 about a perimeter of the outer wall 174.

The fastening apparatus 110 may further include a plurality of serrations 182 (e.g., projections) on at least one of the first and second washer 160, 170 for engaging the other of the first and second washer 160, 170, as illustrated in FIG. 10. As noted hereinabove, such serrations 182 are especially useful in tolerating large shear forces applied on one of the first and second members 114, 118. A distal surface 168 of the first washer 160 may include a plurality of serrations 182 (e.g., pyramidical, conical, frustoconical, hemispherical) for frictionally engaging and/or penetrating into the proximal surface 177 of the second washer 170. As such, the serrations 182 may substantially assist the nose portion 154 of the nut member 142 in substantially inhibiting slippage between the first and second members 114, 118 due to shear loading on the first and/or second members 114, 118.

In yet another aspect of the present invention, illustrated in FIGS. 11–20, a locking apparatus 310 may be utilized to secure or substantially inhibit displacement of the fastener 222 relative to the first and second member 214, 218. Furthermore, the locking apparatus 310 may be used in conjunction with a fastening apparatus 210 to substantially inhibit displacement of the fastener 222 relative to one of the members interconnected thereby, especially in instances where the fastener 222 loosens relative to the nut member 242. In particular, in instances where the fastening apparatus 210 comprises a fastening member 222 and a nut member 242, wherein at least a portion of the fastening member 222 is threadedly engagable with the nut member 242 to interconnect first and second members 214, 218, the locking apparatus 310 may be used to lock or secure the fastening member 222 relative to one of the first and second members 214, 218. In this regard, the locking device 310 enhances the interconnection between the first and second members 214, 218 as the locking device 310 substantially inhibits the fastening member 222 (e.g., bolt) from loosening and/or displacing relative to the nut member 242, which thereby inhibits the fastening member 222 from separating from the nut member 242 and/or the first member 214. As such, the locking device 310 is especially useful in instances where such fastening members 222 are susceptible to "loosening" relative to the nut member 242, such as where the fastening apparatus 210 and/or the first and second members 214, 218 are subjected to vibrations (e.g., random vibrations) or loading, and/or contraction of the first and/or second members 214, 218 and/or the fastener 222 and/or the nut member 242 relative to each other. In this regard, the locking device 310 is especially useful to inhibit loosened fastening members 222 from damaging nearby instruments or equipment.

Figure 16:
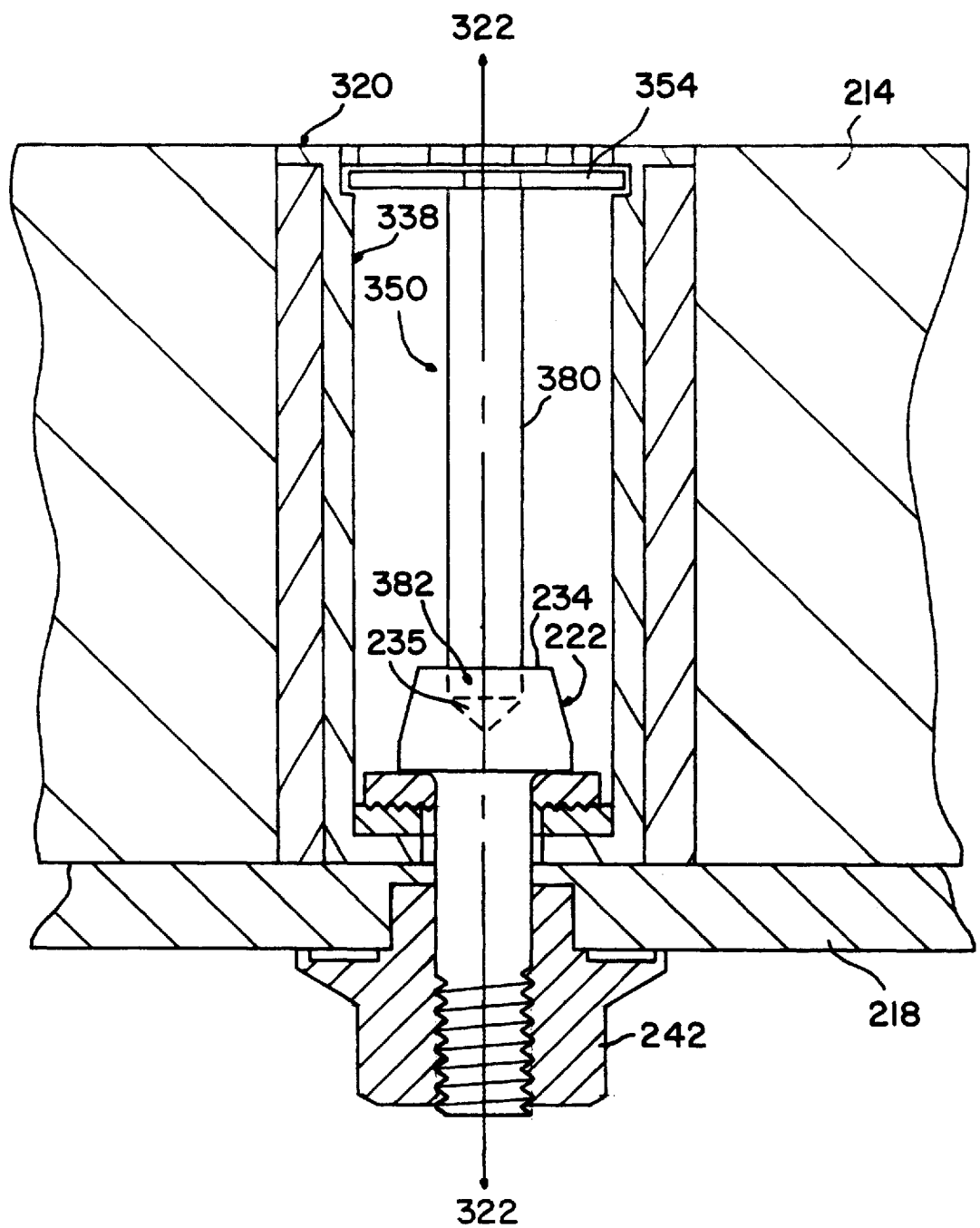
FIG. 16 is a section view of the locking device illustrated in FIG. 11 positioned to secure the fastener relative to the first and second members.

As illustrated in FIGS. 11 and 16, the first and second members 214, 218 are fastenable together, in abutting relation, via the fastening member 222 and nut member 242. In this regard, the fastener 222 is configured such that at least a portion of the fastener 222, specifically, a distal end 228 of a shank portion 226, is receivable within and insertable into the first and second bores 216, 220 of the first and second members 214, 218, respectively. In this regard, upon insertion of at least the distal end 228 of the fastener 222 into and/or through the first and second bores 216, 220 of the first and second members 214, 218, respectively, the nut member 228 may engage at least the distal end 228 of the fastener 222, proximate at least a distal surface 213 of the second member 218, to interconnect the first and second members 214, 218. In one embodiment, at least the distal end 228 of the fastener 222 and the nut member 242 comprise threads such that the nut member 242 is threadedly engagable with at least the distal end 228 of the fastener 222 to fasten the first member 214 to the second member 218. A substantial segment of the shank portion 226 of the fastener 222 may include male thread segments 230 which are engagable with female thread segments 246 formed in the inner wall 248 of the nut member 242.

As noted hereinabove, in one embodiment, at least a portion of the nut member 242 threadedly engages at least a distal end 228 of the fastener 222 proximate a distal surface 213 of the second member 218. In order to substantially inhibit displacement (e.g., rotational, axial) of the nut member 242 relative to the second member 218, the nut member 242 may be mechanically and/or chemically fastened to the distal surface 213 of the second member 218. In one embodiment, an annular groove or recess 250 may be formed in a proximal surface 253 of the body portion 256 of the nut member 242, and specifically, in a flange portion 251 of the nut member 242. An epoxy adhesive (e.g., EA9394, available from Hysol) may be applied to the recess 250 to chemically bond or secure the nut member 242 to the distal surface 213 of the second member 218. Alternatively, the nut member 242 may be attached to the second member 218 via mechanical fasteners, such as pins, rivets, screws, bolts, clamps etc. The body portion 256 of the nut member 242 may include a quick action nut system, such as those disclosed in U.S. Pat. Nos. 4,378,187, 5,118,237, 3,352,341 and 4,083,393 and the Zip Nut™, which is commercially available from Fastener Technologies, Chantilly, Va., or, alternatively, may comprise a standard nut.

For purposes of providing a locking apparatus 310 capable of substantially positively securing the fastening member 222 relative to at least one of the first and second members 214, 218, as opposed to a frictional securement, the locking apparatus 310 is capable of extending between and/or interconnecting the fastening member 222 and the first member 214. In one embodiment, illustrated in FIGS. 11–16, the locking apparatus 310 includes a tubular spool insert 320 insertable and securable within the first bore of the first member 214 and a locking member 350, which extends between the fastener 222 and the spool insert 320. In particular, for purposes of interfacing with the locking member 350, the spool insert 320 includes an annular groove 324 positioned about a bore 334, which extends through the spool insert 320, the bore 334 being defined by an inner wall 338 of the spool insert 320. The annular groove 324 may include at least one slot 328 configured for receiving a portion of the locking member 350 (which will be described in more detail hereinbelow). The spool insert 320 may be secured within the first bore of the first member 214 via a mechanical fastener or chemical bonding. In one embodiment, the spool insert 320 is interconnected to the first member 214, within the first bore, via at least one fastener, such as pins, rivets, bolts, screws and clamps. In another embodiment, the spool insert 320 is chemically bonded to the first member 214 by an epoxy adhesive (e.g., EA9394, available from Hysol).

Alternatively, in another embodiment (not shown), where a spool insert 320 is not utilized, the annular groove 324 and slots 328 associated therewith may be integrally formed within the first member 214, and specifically, in the first bore wall which defines the first bore. In this regard, the locking member 350 may interconnect and extend between the fastener 222 and the first member 214 to substantially inhibit displacement of the fastener 222 relative to the first member 214.

For purposes of providing a secure engagement between the locking member 350 and the spool insert 320 to substantially inhibit displacement (e.g., rotational, axial) of the fastener 222 relative to the first member 214, in one embodiment, the locking member 350 includes an elastically deformable upper portion 354 (e.g., snap ring) capable of being received within the first bore 216 and specifically, within the annular groove 324. The locking member 350 may further include at least one tab 360 positioned about a perimeter of the upper portion 354 of the locking member 350 for engaging the spool insert 320 (as will be described in more detail hereinbelow). In order to engage the spool insert 320, and specifically, be captured within the annular groove 324, the upper portion 354 may have an unflexed diameter, $D_c$, greater than the diameter, $D_s$, of the spool insert 320, as defined by the inner wall 338 of the spool insert 320. In this regard, the upper portion 354 may be sized to have an unflexed diameter, $D_c$, substantially corresponding to the diameter, $D_g$, of the annular groove 324. Furthermore, the upper portion or snap ring 354 may include a pair of radially inwardly flexible prongs 366, which are capable of being "pinched" or flexed radially inwardly to allow insertion and positioning of the locking member 350 within the bore 334 of the spool insert 320. In one embodiment, the prongs 366 each include a prong bore 368 which facilitates pinching of the prongs 366 for insertion into the locking member 350, and specifically insertion of the upper portion 354 and associated tab 360 into the annular groove 324 and one of the slots 328 associated with the annular groove 324, respectively. In this regard, the prong bores 368 may be configured to receive the tips of a pinching instrument (not shown) (e.g., instrument having plier-like capability). The upper portion 354 may be fabricated from a metal, such as spring steel or beryllium copper, or from a high strength moldable plastic, such as Torlon™, available from Amoco Polymers, Inc., Alpharetta, Ga., or Ultem™, which is available from General Electric Company, Fairfield, Conn.

The annular groove 324 and each of the slots 328 associated therewith are configured to receive at least a perimeter of the upper portion 354 and one of the tabs 360, respectively. For purposes of facilitating positioning and removal of the locking apparatus 310, the annular groove 324 is located in a proximal portion of the spool insert 320. Furthermore, the annular groove 324 and the slots 328 may be sized to abuttingly engage at least a portion of the perimeter of the upper portion 354 and the tab 360. In this regard, in order to facilitate receipt of at least a portion of the perimeter of the upper portion 354, the annular groove 324 may have a thickness, $T_g$, greater than the thickness, $T_c$, of the upper portion 354. In one embodiment, the thickness of the annular groove 324, $T_g$, is about 0.025 inches greater than the thickness of the upper portion 354, $T_c$.

The tab 360 of the upper portion 354 is configured such that the tab 360 extends radially outwardly from and relative to the upper portion 354. In this regard, the tab 360 is receivable within one of the slots 328 of the annular groove 324 to substantially inhibit displacement (e.g., rotational, axial) of the fastener 222 relative to the first member 214. The tab 360 and the slots 328 may be configured such that the tab 360 is slidably and abuttingly engagable with each of the slots 328.

As noted hereinabove, the locking member 350 interconnects the first member 214 and the fastener 222 to substantially inhibit displacement (e.g., axial, rotational) of the fastener 222 relative to the first member 214. In this regard, the locking member 350 may further include a leg 380 interconnected with the upper portion 354, the leg 380 being capable of engaging the fastener 222. In one embodiment, the leg 380 extends distally from a distal surface of the upper portion 354 and is oriented normal to the upper portion 354. As illustrated in FIGS. 11, 14–16, a distal portion 382 of the leg 380 is selectively engagable with a proximal portion 234 of the fastener 222. In order to substantially inhibit displacement of the fastener 222 relative to the leg 380, in one embodiment, at least the distal portion 382 of the leg 380 is selectively receivable within a female portion 235 on the proximal portion 234 of the fastener 222, as shown in FIG. 16. For instance, the female portion 235 and the distal portion 382 of the leg 380 may have correspondingly sized and configured cross-sections to substantially inhibit relative rotational movement therebetween (e.g., triangular, rectangular, square, pentagonal, hexagonal, etc. cross-sections). In a preferred embodiment, shown in FIGS. 11, 14–16, the female portion 235 and the distal portion 382 of the leg 380 are hexagonally configured. The leg 380 may be either integrally formed with the upper portion 354 or, alternatively, a separate member interconnected to the upper portion 354. Furthermore, the leg 380 may be fabricated from a metal, such as aluminum or stainless steel, or from a high strength plastic, such as Torlon™ or Ultem™. In an alternative embodiment (not shown), for purposes of substantially inhibiting rotational movement of the fastener 222 relative to the leg 380, the proximal portion 234 (e.g., head) may be receivable within a female-type distal portion of the leg 380, wherein the distal portion 382 of the leg 380 is upper portionable of receiving the proximal portion 234 of the fastener 222.

As can be appreciated, upon torquing or tightening of the fastener 222 relative to the nut member 242, the position of the tab 360 of the locking member 350 relative to the slots 328 may vary, depending upon the degree of torquing of the fastener 222 relative to the nut member 242 desired (e.g., 10 inch-lbs., 150 inch-lbs.). In order to provide a locking apparatus 310, and specifically, a upper portion 354 and tab 360 associated therewith, which is capable of being received within a slot 328 at at least one of a plurality of positions about the annular groove 324, the position of each of the slots 328 about the annular groove 324 may be selected.

Figure 13:
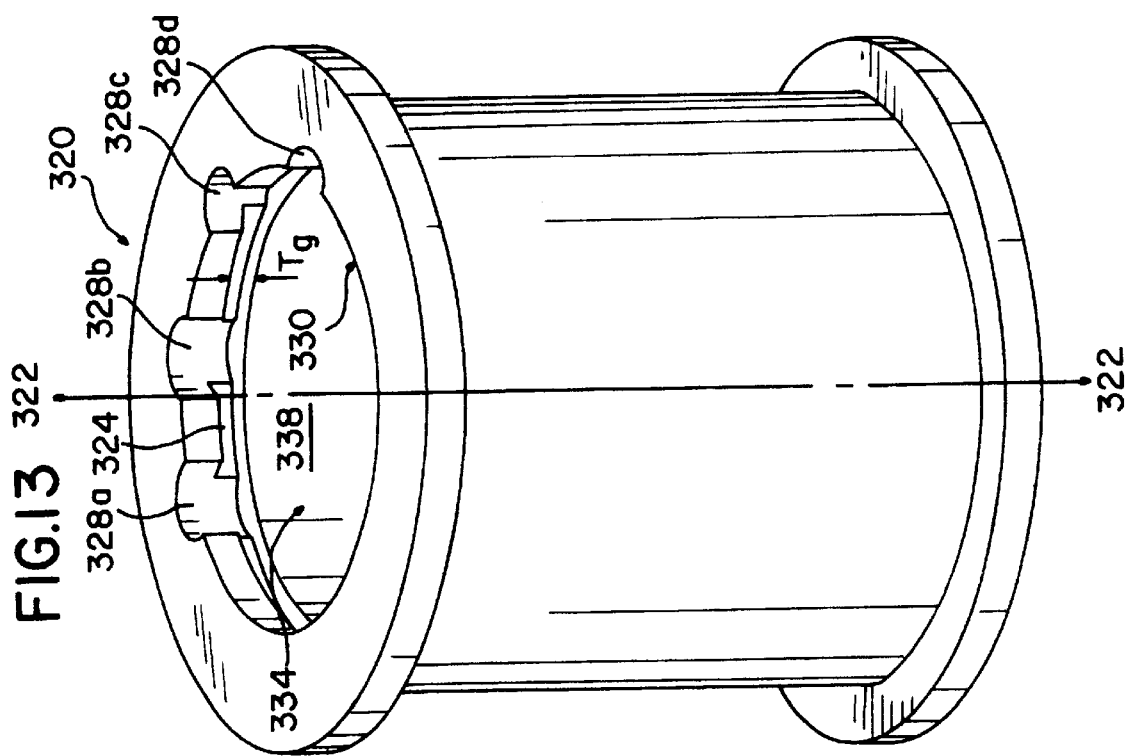
FIG. 13 is a perspective view of the spool insert illustrated in FIG. 11.
Figure 12:
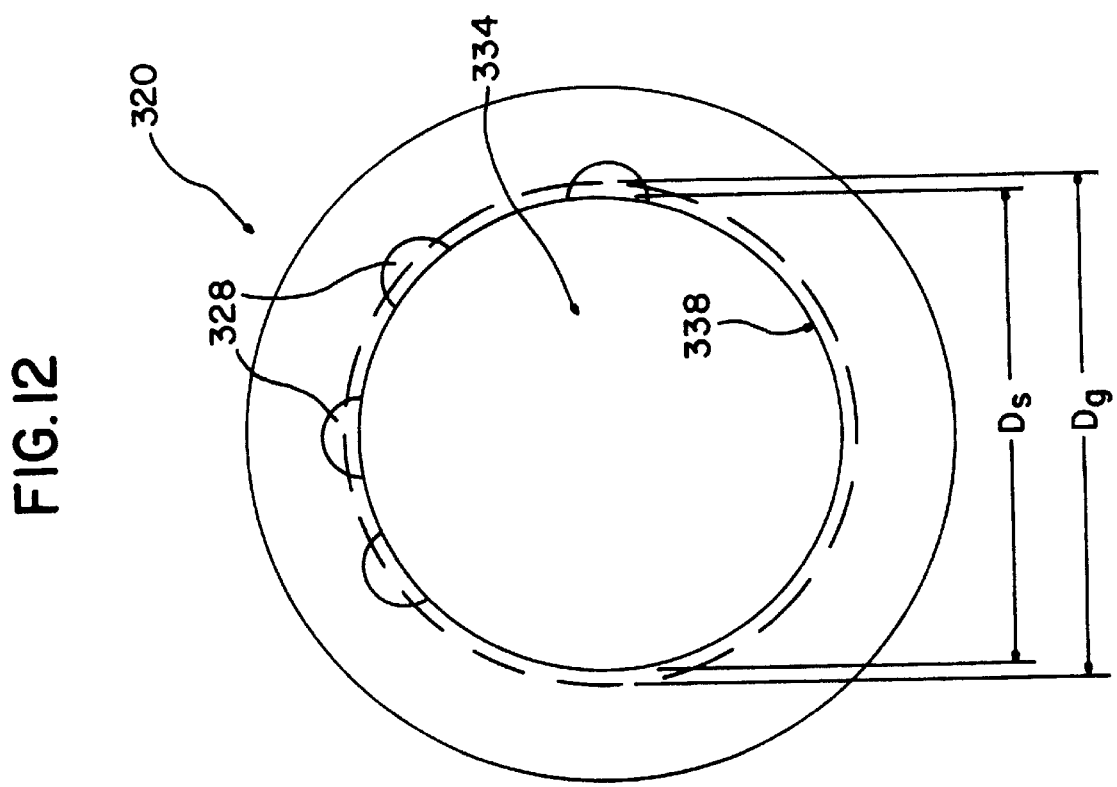
FIG. 12 is a top plan view of the spool insert illustrated in FIG. 11.
Figure 14:
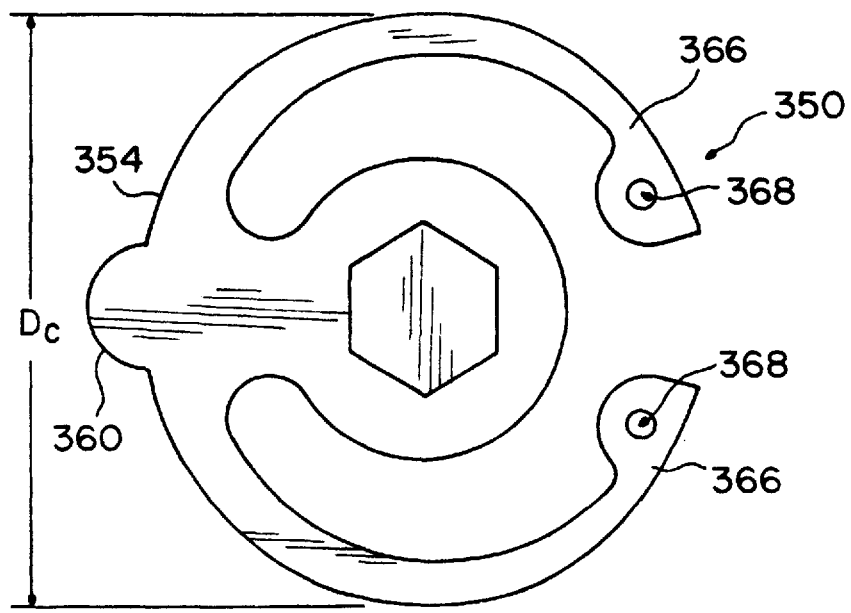
FIG. 14 is a bottom plan view of the locking member illustrated in FIG. 11.
Figure 15:
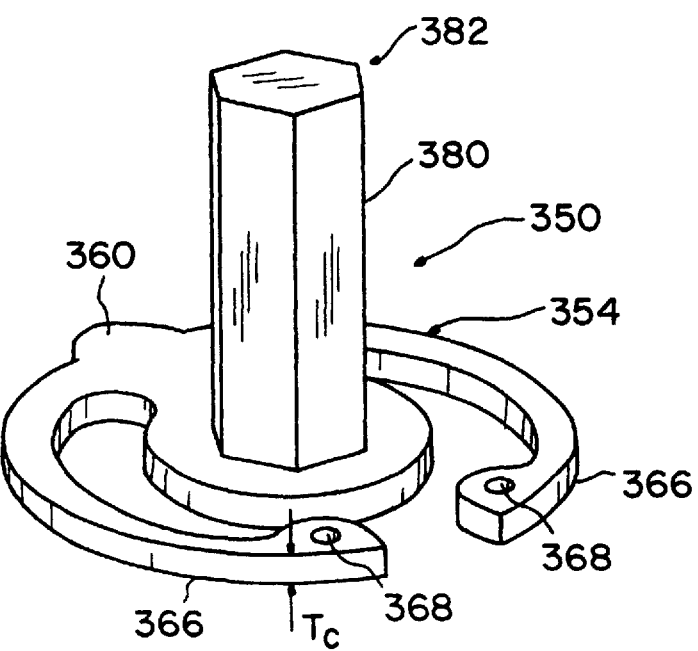
FIG. 15 is a perspective view of the locking member illustrated in FIG. 11.

Furthermore, the configurations of the distal portion 382 of the leg 380 and the female portion 235 of the fastener 222 may be selected. In one embodiment of the invention, where the configurations of the distal portion 382 and the female portion 235 are hexagonal in cross-section, the slots 328 may be positioned about the annular groove 324 at non-60° intervals, as shown in FIGS. 12–13. Such positioning of the slots 328 optimizes the positioning and locking of the locking member 350 as the rotational position of the tab 360 may already be varied in 60° intervals, relative to a longitudinally-extending central axis 322 of the spool insert 320, due to the hexagonal configuration of the distal portion 382 of the leg 380 and the female portion 235 of the fastener 222. In this regard, the slots 328 may be positioned, relative to the central axis 322, about the annular groove 324 at equal intervals. For instance, in one embodiment, relative to the longitudinally-extending central axis 322 of the spool insert 320, five slots (e.g., $328_a$, $328_b$, $328_c$, $328_d$, $328_e$) are equally spaced about the annular groove 324 at intervals of 72°. In another embodiment (not shown), relative to the longitudinally-extending central axis 322 of the spool insert 320, seven slots (e.g., $328_a$, $328_b$, $328_c$, $328_d$, $328_e$, $328_f$, $328_g$) are equally spaced about the annular groove 324 at intervals of 51.43°. In this regard, the tab 360 may be receivable within at least one of the slots 328 to substantially inhibit rotation of the fastener 222 relative to the first member 214.

The locking apparatus 310, illustrated in FIGS. 11–16, may also be used in association with either or both of the above-described fastening apparatuses 10, 110, illustrated in FIGS. 1–5 and FIGS. 6–10, respectively. In one embodiment, the fastening apparatus capable of accommodating misalignments between bores of the members to be interconnected may be used in combination with the locking apparatus for limiting displacement (e.g., rotation, axial) of the fastener relative to the interconnected members. In such instances where the bores are misaligned relative to each other, the locking device may tiltably engage and/or interconnect the first member (e.g., via the spool insert) and the fastener interconnecting the members, as the fastener interconnectable to the locking device is not coincident with a longitudinally extending center axis of the bore associated therewith.

Figure 17:
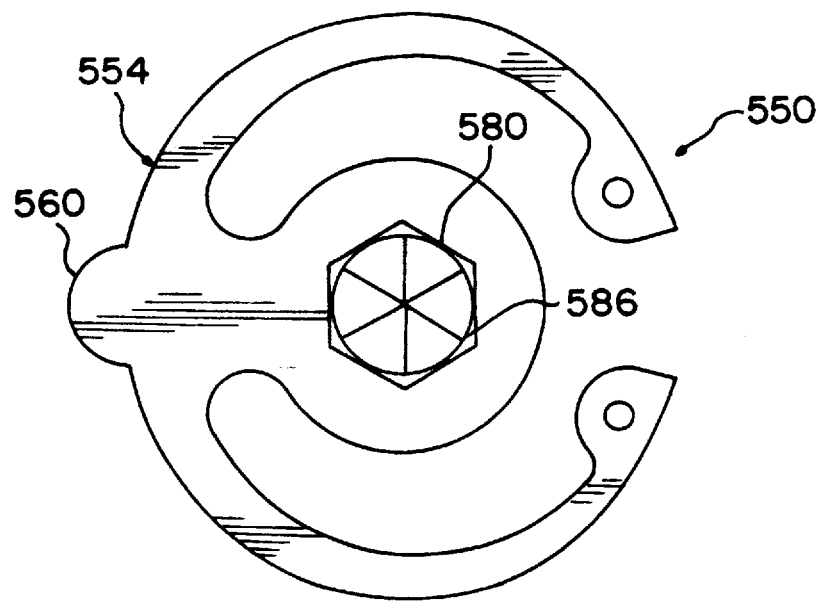
FIG. 17 is a bottom plan view of another embodiment of the locking member of the locking device illustrated in FIG. 11.
Figure 18:
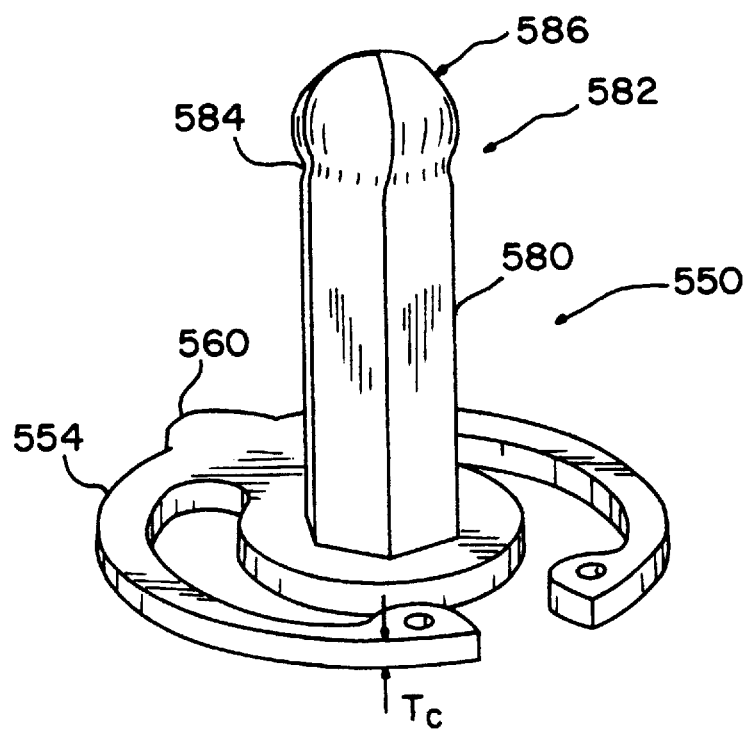
FIG. 18 is a perspective plan view of the embodiment of the locking member illustrated in FIG. 17.
Figure 19:
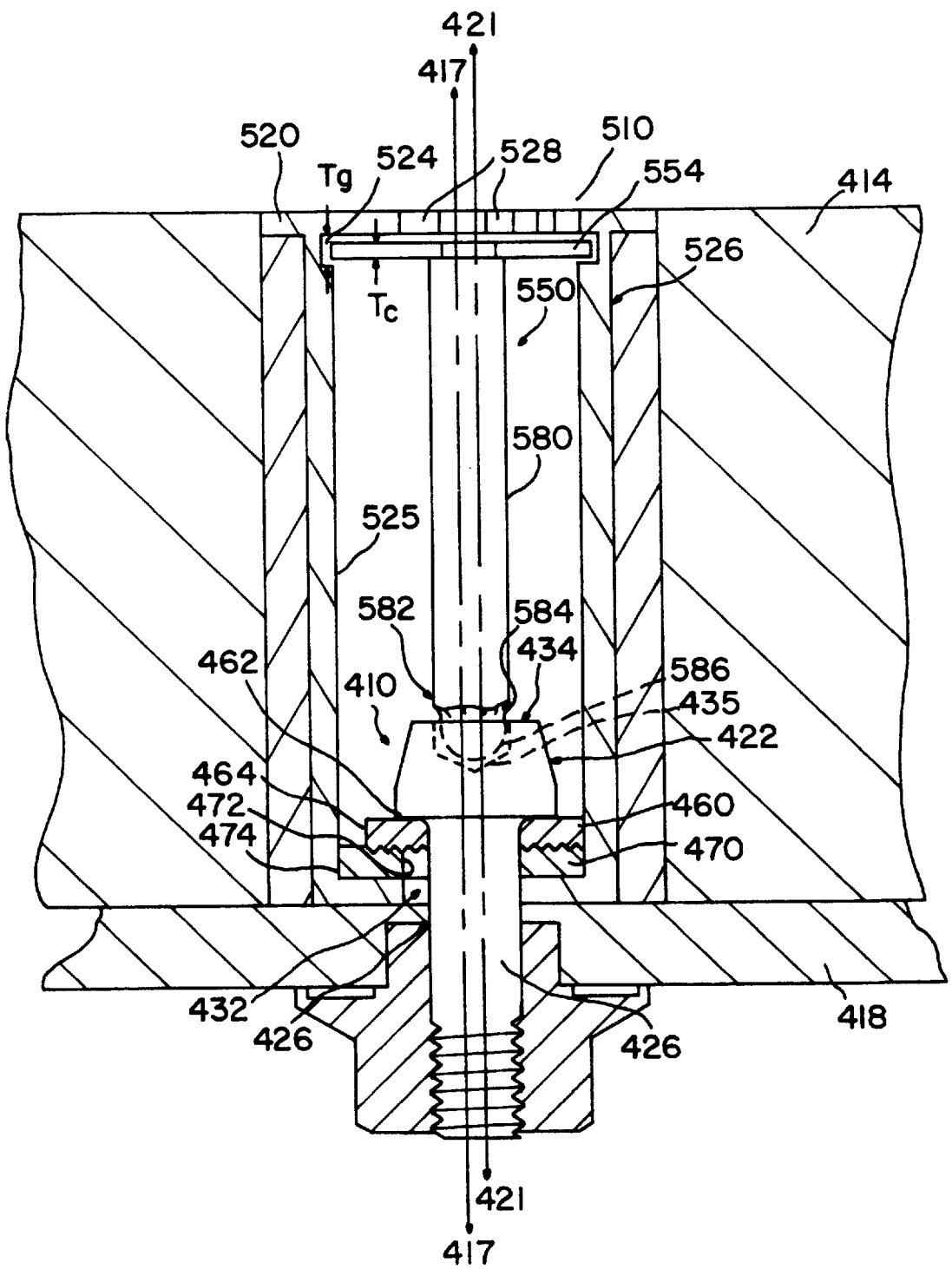
FIG. 19 is a section view of the locking device illustrated in FIGS. 17–18 positioned to secure the fastener relative to the first and second members.

As illustrated in FIGS. 17–19, in this embodiment, the locking device 510 may be used in conjunction with the fastening apparatus 410. In order to accommodate misalignments between the bores of the first and second members 414, 418 to be interconnected via a fastener 422 and nut member 442, first and second washers 460, 470 may be utilized substantially as described hereinabove. In this regard, the first and second washers 460, 470 may be positioned about the shank portion 426, within the first bore of the first member 414, such that the first and second washers 460, 470 are proximally positioned relative to the second member 418 to engage a proximal segment 432 of the fastener shank portion 426.

Each of the first and second washers 460, 470 may include concentric inner walls 462, 472 and outer walls 464, 474, respectively. In this regard, for purposes of accommodating misalignments between the bores of the first and second members 414, 418, the inner wall 462 of the first washer 460 is slidably and/or abuttingly engagable with a proximal segment 432 of the fastener shank portion 426 about a perimeter of the inner wall 462 of the first washer 460. In addition, the outer wall 474 of the second washer 470 is slidably interconnectable or engagable with the bore wall of the first bore about a perimeter of the outer wall 474 of the second washer 470. In instances where a spool insert 520 is used to provide enhanced shear support to the first member 414, as shown in FIG. 19, the spool insert 520 may be positioned within the first bore of the first member 414 such that an outer wall 526 of the spool insert 520 abuttingly engages the bore wall of the first bore. In this regard, the outer wall 474 of the second washer 470 is slidably and/or abuttingly engagable with the inner wall 525 of the spool insert 520 about a perimeter of the outer wall 474 of the second washer 470.

In order to provide a fastening apparatus 410 capable of accommodating misalignments between the bores of the first and second members 414, 418, in combination with a locking device 510 designed to substantially limit displacement of the fastener 422 relative to the first member 414, the locking device 510 is capable of tiltably engaging and interconnecting the fastener 422 and the spool insert 520, and specifically, the annular groove 524 and one of the slots 528 of the spool insert 520. As illustrated in FIG. 19, in instances where the central axis 417 of the first bore is not coincident with the central axis 421 of the second bore, the fastener 422, which is aligned with the central axis 421 of the second bore, may be correspondingly displaced relative to the central axis 417 of the first bore in order to interconnect the first and second members 414, 418. Correspondingly, due to the misalignment, the locking device, 510, and specifically, the upper portion 554 of the locking member 550 and leg 580 extending distally therefrom may tiltably engage the spool insert 520, within the annular groove 524, and the fastener 422, respectively, as the leg 580 is inclined at an angle relative to the central axis 421 of the second bore, the angle corresponding to the amount of misalignment between the first and second bores.

As illustrated in FIGS. 17–19, for purposes of allowing the upper portion 554 and the tab 560 of the locking member 550 to be received and engaged within the annular groove 524 and any one of the slots 528, respectively, the annular groove 524 and the upper portion 554 may be sized and configured such that the upper portion 554 is capturable within the annular groove 524, even in instances where the upper portion 554 is inclined (e.g., angled) relative to the annular groove 524. In this regard, the annular groove 524 may have a thickness, $T_g$, which is greater than the thickness, $T_c$ of the upper portion 554 to accommodate a tiltable engagement between the upper portion 554 and the annular groove 524.

Furthermore, in instances where a misalignment between the first and second bores is accommodated via first and second washers 460, 470, as illustrated in FIG. 19, the leg 580 may be configured to tiltably engage the fastener 422. More specifically, in order to accommodate the resulting angled engagement between the leg 580 and the proximal portion 434 (e.g., head) of the fastener 422, the leg 580 may further include, at the distal portion 582 of the leg 580, a necked segment 584 of reduced area that extends into a head-engaging portion 586 (e.g., ball end allen wrench), as illustrated in FIGS. 17–19. For example, in one embodiment, for purposes of engaging the leg 580 to the fastener 422, the leg 580 and head-engaging portion 586 are configured to have a hexagonal cross-section and the proximal portion 434 of the fastener 422, specifically, the female portion 435, is hexagonally configured and sized to receive the head-engaging portion 586. The head-engaging portion 586 is thus engagable with the proximal portion 434 of the fastener 422 as the neck segment 584 and the head-engaging portion 586 cooperate with the female portion 435 to interconnect the leg 580 and fastener 422, even in instances where the leg 580 is angled relative to the fastener 422.

In another embodiment, illustrated in FIG. 20, the apparatuses described hereinabove may be used in combination with each other as a fastening system 600, for example, to accommodate misalignments between the first and second bores of the members 614, 618 to be interconnected via a fastener 622 (e.g., bolt), to substantially inhibit slippage between the interconnected members 614, 618 due to the effect of shear loads on the fastener 622 relative to the members 614, 618, and to substantially inhibit displacement (e.g., axial, rotational) of the fastener 622 relative to the interconnectable members 614, 618. In this regard, substantially as described hereinabove, for purposes of accommodating misalignments between the first and second bores of the first and second members 614, 618, inner and outer walls 662, 674 of the first and second washers 660, 670 may be positioned to slidably engage the shank portion 626 of the fastener 622 and the inner wall 690 of the spool insert 688, respectively. Furthermore, an inner wall 658 of a nose portion 654 of a nut member 642 may be configured to abuttingly engage a proximal portion 640 of the fastener 622 to substantially inhibit tilting of the fastener 622 relative to the nut member 642 when one or both of the first and second members 614, 618 is subject to shear loading. The inner wall 658 and the proximal portion 640 may be substantially smooth (e.g., threadless), or alternatively, may include a plurality of knurls 698, as illustrated in FIG. 20. For purposes of substantially inhibiting displacement of the fastener 622 relative to the first and/or second members 614, 618, the fastening system 600 may further include a locking member 750 which interconnects the spool insert 688 and the fastener 622. Specifically, a upper portion 754 and/or a tab 760 may engage the spool insert 688 within an annular groove 724 and one of a plurality of slots 728 and a distal portion 786 of a leg 780 may engage the head 634 of the fastener 622. As such, substantially as described in more detail hereinabove with respect to other embodiments, the fastening system 600 may accommodate misalignments between the bores of the first and second members 614, 618, substantially inhibit slippage between the first and second members 614, 618 due to shear loading, and substantially inhibit displacement of the fastener 622 relative to the first and/or second members 614, 618.

In yet another embodiment (not shown), the above-described locking device for limiting displacement of the fastener relative to the interconnectable members may be used in combination with the fastening apparatus for substantially inhibiting slippage between the interconnected members due to shear loading on one of the members.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A fastening system for interconnecting and substantially inhibiting slippage between first and second members having first and second bores defined by first and second bore walls, respectively, said fastening system comprising:

a fastening member having a head and a shank portion, wherein said shank portion is receivable within the first and second bores in the first and second members, respectively; and a nut means, positionable distal to a proximal surface of the second member, for securably engaging said shank portion, said nut means comprising a threaded portion and a nose portion adapted to extend proximally from said threaded portion into the second bore in the second member, wherein said nose portion has a smooth inner wall for abuttingly engaging a proximal segment of said shank portion and an outer wall adapted to abuttingly engage the second bore wall of the second member, distal to said head of said fastening member, to substantially inhibit at least lateral movement of at least said shank portion of said fastening member relative to at least the second member.

2. A fastening system, as claimed in claim 1, wherein a distal segment of said shank portion comprises threads, distal said proximal segment of said shank portion, wherein said threaded portion of said nut means threadedly engages said distal segment of said shank portion, distal said nose portion.

3. A fastening system, as claimed in claim 1, wherein said proximal segment of said shank portion is threadless.

4. A fastening system, as claimed in claim 1, wherein said nose portion is adapted to extend into the second bore from a distal surface of the second member toward a proximal surface of the second member.

5. A fastening system as claimed in claim 1, wherein said outer wall of said nose portion includes a plurality of knurls pressable into the second bore wall defined by the second bore of the second member.

6. A fastening system, as claimed in claim 1, further comprising:

washer means, engagable with at least one of said shank portion of said fastening member and the first bore wall defined in the first bore, for accommodating a misalignment between the first and second bores of the first and second members, respectively.

7. A fastening system as claimed in claim 1, further comprising:

a tubular insert member, positionable within and in abutting relation to the first bore and the first bore wall defined by the first bore, respectively, of the first member, wherein said tubular insert member includes an inner diameter defined by an inner wall for receiving said shank portion of said fastening member therethrough, wherein said tubular insert member comprises a spool-type insert having an outer diameter adapted to correspond to a diameter of the first bore in the first member.

8. A fastening system, as claimed in claim 1, further comprising:

a locking means, interconnectable between said first member and said fastening member, for substantially inhibiting displacement of said fastening member relative to said first member.

9. A fastening system, as claimed in claim 8, wherein one of said first member and a tubular insert positionable within said first member includes an annular channel, wherein said locking means comprises a locking member, insertable within said tubular insert member, said locking member having a leg engagable with said fastening member and an elastically deformable upper portion interconnected with said leg, wherein a perimeter of said elastically deformable upper portion is positionable within said annular groove.

10. A fastening system, as claimed in claim 9, wherein said one of said first member and said tubular insert includes at least one slot radially extending outwardly relative to and from said annular channel, wherein said locking means further comprises a tab extending radially outwardly from said perimeter of said elastically deformable upper portion, wherein said tab is positionable within said slot.

11. A fastening system, as claimed in claim 1, further comprising:

washer means, positionable within one of the first bore and a tubular insert member positionable within the first bore, for accommodating a misalignment between the first and second bores of the first and second member, respectively.

12. A fastening system for interconnecting and substantially inhibiting slippage between first and second members, said fastening system comprising:

a fastening member having a head and a shank portion, wherein said shank portion is receivable within first and second bores in the first and second members, respectively;

a nut means, positionable distal to a proximal surface of the second member, for securably engaging said shank portion, said nut means comprising a threaded portion and a nose portion adapted to extend proximally from said threaded portion into the second bore in the second member, wherein at least a proximal part of said nose portion has a smooth inner wall for abuttingly engaging a proximal segment of said shank portion, distal to said head of said fastening member; and washer means, engagable with at least one of said shank portion of said fastening member and a first bore wall defined in the first bore, for accommodating a misalignment between the first and second bores of the first and second members, respectively, wherein said washer means comprises first and second washers each having inner and outer walls, wherein said inner wall of said first washer is slidably engagable with said shank portion of said fastening member, distal to said proximal segment, and said outer wall of said second washer is slidably engagable with the first bore wall of the first member.

13. A fastening system for interconnecting and substantially inhibiting slippage between first and second members, said fastening system comprising:

a fastening member having a head and a shank portion, wherein said shank portion is receivable within first and second bores in the first and second members, respectively;

a nut means, positionable distal to a proximal surface of the second member, for securably engaging said shank portion, said nut means comprising a threaded portion and a nose portion adapted to extend proximally from said threaded portion into the second bore in the second member, wherein at least a proximal part of said nose portion has a smooth inner wall adapted to abuttingly engage a proximal segment of said shank portion, distal to said head of said fastening member; and washer means, positionable within one of the first bore and a tubular insert member positionable within the first bore, for accommodating a misalignment between the first and second bores of the first and second members, respectively, wherein said washer means comprises first and second washers each having inner and outer walls, wherein said inner wall of said first washer and said outer wall of said second washer are slidably engagable with said shank portion of said fastening member and a bore wall of said one of the first bore and said tubular insert member, respectively.

14. A fastening system for interconnecting proximal and distal members, the proximal and distal members having first and second bores defined by first and second bore walls in the proximal and distal members, respectively, said fastening system comprising:

a fastening member having a head and a shank portion, wherein said shank portion is adapted to be received within the first and second bores of the proximal and distal members, respectively;

a nut member for engaging said shank portion of said fastening member to interconnect the proximal and distal members, said nut member comprising a threaded portion and a nose portion, wherein each of said threaded and nose portions have inner and outer walls, wherein said threaded portion is threadedly engagable with a distal segment of said shank portion, wherein at least a proximal part of said inner wall of said nose portion is adapted to abuttingly engage a proximal segment of said shank portion and at least a proximal part of said outer wall of said nose portion is adapted to abuttingly engage the second bore wall in the distal member to at least substantially inhibit at least lateral movement of said shank portion of said fastening member relative to at least the distal member.

15. A fastening system, as claimed in claim 14, wherein said proximal part of said outer wall of said nose portion is positionable between distal and proximal surfaces of one of the distal and proximal members.

16. A fastening system, as claimed in claim 14, wherein said proximal part of said outer wall of said nose portion is positionable between distal and proximal surfaces of the distal member.

17. A fastening system, as claimed in claim 14, wherein an inner diameter of said proximal part of said nose portion, defined by said inner wall, is less than about 0.002 inches greater than a diameter of said proximal segment of said shank portion.

18. A fastening system, as claimed in claim 14, wherein at least a portion of said proximal part of said outer wall of said nose portion and at least a portion of the proximal segment of the shank portion are threadless.

19. A fastening system, as claimed in claim 14, wherein said outer wall of said nose portion comprises a plurality of knurls, wherein at least one of said plurality of knurls is pressable into the second bore wall of the distal member.

20. A fastening system, as claimed in claim 14, wherein at least said nose portion of said nut member comprises a material selected from the group consisting of stainless steel, titanium and beryllium copper.

21. A fastening system, as claimed in claim 14, wherein a length of said proximal part of said nose portion is at least about one-half said diameter of said shank portion of the fastener.

22. A fastening system, as claimed in claim 14, wherein said proximal part of at least said inner wall of said nose portion is sized to have a length less than or equal to a thickness of the distal member, wherein the thickness of the distal member is defined by proximal and distal surfaces of the distal member.

23. A fastening system, as claimed in claim 14, further comprising:

washer means, engagable with at least one of said shank portion of said fastening member and the first bore wall defined in the first bore, for accommodating a misalignment between the first and second bores of the proximal and distal members, respectively.

24. A fastening system for substantially inhibiting tilting of a fastening member relative to proximal and distal members, the fastening member being insertable in first and second bores defined by first and second bore walls in the proximal and distal members, respectively, said fastening system comprising:

a nut member for engaging a shank portion of the fastening member to interconnect the proximal and distal members, said nut member comprising a threaded portion and a nose portion, wherein each of said threaded and nose portions have inner and outer walls, wherein said threaded portion is threadedly engagable with a distal segment of the shank portion, wherein a proximal part of said nose portion is abuttingly positionable about a proximal segment of the shank portion to pressingly engage the proximal segment of the shank portion; and washer means, engagable with at least one of the shank portion of the fastening member and the first bore wall defined in the first bore, for accommodating a misalignment between the first and second bores of the proximal and distal members, respectively, wherein said washer means comprises proximal and distal washers each having inner and outer walls, wherein said inner wall of said proximal washer is slidably engagable with said shank portion of said fastening member, proximal to said proximal part, and said outer wall of said distal washer is slidably engagable with the first bore wall of the proximal member.

* * * * *